United States Patent
Lee

(10) Patent No.: US 11,960,888 B2
(45) Date of Patent: Apr. 16, 2024

(54) MEMORY SYSTEM, MEMORY CONTROLLER, AND METHOD FOR OPERATING MEMORY SYSTEM

(71) Applicant: SK hynix Inc., Gyeonggi-do (KR)

(72) Inventor: Seok-Jun Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 516 days.

(21) Appl. No.: 16/721,117

(22) Filed: Dec. 19, 2019

(65) Prior Publication Data

US 2021/0026633 A1 Jan. 28, 2021

(30) Foreign Application Priority Data

Jul. 24, 2019 (KR) .................. 10-2019-0089291

(51) Int. Cl.
*G06F 9/30* (2018.01)
*G06F 12/123* (2016.01)

(52) U.S. Cl.
CPC ........ *G06F 9/30043* (2013.01); *G06F 12/124* (2013.01); *G06F 2212/1044* (2013.01)

(58) Field of Classification Search
CPC .. G06F 12/023; G06F 9/30043; G06F 12/124; G06F 2212/1044; G06F 12/0246; G06F 12/0815; G06F 15/8069
See application file for complete search history.

(56) References Cited

U.S. PATENT DOCUMENTS

| | | | | |
|---|---|---|---|---|
| 6,141,722 A | * | 10/2000 | Parsons | G06F 12/023 |
| | | | | 711/2 |
| 6,996,516 B1 | * | 2/2006 | Kimura | G06F 8/75 |
| | | | | 703/22 |
| 8,171,206 B2 | | 5/2012 | Struk et al. | |
| 2005/0022173 A1 | * | 1/2005 | Kanade | G06F 9/4881 |
| | | | | 717/103 |
| 2007/0250827 A1 | * | 10/2007 | Ohyama | G06F 9/4484 |
| | | | | 717/162 |
| 2010/0023673 A1 | * | 1/2010 | Struk | G06F 12/08 |
| | | | | 711/E12.008 |

(Continued)

FOREIGN PATENT DOCUMENTS

| | | |
|---|---|---|
| JP | 1995-271603 | 10/1995 |
| KR | 20060087215 A | 8/2006 |

(Continued)

OTHER PUBLICATIONS

Mehadi Hassen et al.; Scalable Function Call Graph-based Malware Classification; ACM; pp. 239-248; retrieved on Nov. 29, 2023 (Year: 2017).*

(Continued)

*Primary Examiner* — S. Sough
*Assistant Examiner* — Cuong V Luu
(74) *Attorney, Agent, or Firm* — IP & T GROUP LLP

(57) ABSTRACT

With regard to a function group including all or some functions included in one of multiple binary codes stored in the memory device, a binary code including a first function that is executed at a first timepoint is loaded into a first memory area at a second timepoint that precedes the first time point, thereby minimizing the operation delay time of the memory system, and minimizing the overhead occurring in the processing of calling a specific function.

17 Claims, 18 Drawing Sheets

(56) References Cited

U.S. PATENT DOCUMENTS

| | | | | |
|---|---|---|---|---|
| 2012/0167075 | A1* | 6/2012 | Tepper | G06F 8/60 |
| | | | | 717/178 |
| 2015/0143339 | A1* | 5/2015 | Rajanna | G06F 8/43 |
| | | | | 717/123 |
| 2021/0263779 | A1* | 8/2021 | Haghighat | G06F 9/5061 |

FOREIGN PATENT DOCUMENTS

| | | |
|---|---|---|
| KR | 10-2007-0040007 | 4/2007 |
| KR | 20160073402 A | 6/2016 |
| KR | 20170040734 A | 4/2017 |

OTHER PUBLICATIONS

Zhijia Zhao et al.; Call Sequence Prediction through Probabilistic Calling Automata; ACM; pp. 745-762; retrieved on Nov. 29, 2023 (Year: 2014).*

* cited by examiner

MEMORY SYSTEM, MEMORY CONTROLLER, AND METHOD FOR OPERATING MEMORY SYSTEM

CROSS REFERENCE TO RELATED APPLICATION

This application claims priority from Korean Patent Application No. 10-2019-0089291, filed on Jul. 24, 2019, which is hereby incorporated by reference in its entirety as if fully set forth herein.

BACKGROUND OF THE INVENTION

1. Field of the Invention

Embodiments of the present invention disclosure relate generally to a memory system, a memory controller, and an operating method. More particularly, embodiments of the present invention disclosure relate to memory system, a memory controller, and an operating method exhibiting substantially reduced operation delay time.

2. Description of the Prior Art

A memory system which corresponds to a storage device is a device configured to store data on the basis of a request from a host, such as a computer, a mobile terminal (for example, a smartphone or a tablet), or various other electronic devices. The memory system may include not only a device configured to store data in a magnetic disk such as a hard disk drive (HDD), but also a device configured to store data in a nonvolatile memory such as a solid state drive (SSD), a universal flash storage device (UFS), or an embedded MMC (eMMC) device.

The memory system may further include a memory controller for controlling the memory device. The memory controller may receive a command input from the host and on the basis of the received command, may execute or control operations for reading, writing, or erasing data in a volatile memory or a nonvolatile memory included in the memory system. The memory controller may drive firmware for performing a logical operation for executing or controlling such operations.

Moreover, the size of firmware is increasing as functions of memory controllers become more diversified and complicated. Accordingly, various methods for driving firmware in memories having limited storage capacities are being developed, and there may occur a problem in that the operation delay time of the firmware may increase due to the overhead occurring when such methods are performed.

SUMMARY OF THE INVENTION

Embodiments of the present invention disclosure may provide a memory system, a memory controller, and an operating method wherein the operation delay time of the memory system can be minimized.

In addition, embodiments of the present invention disclosure may provide a memory system, a memory controller, and an operating method wherein an overhead occurring in the process of calling a specific function can be minimized.

According to an aspect of the present invention, various embodiments provide a memory system including a memory device and a memory controller configured to control the memory device.

The memory device may store firmware including multiple binary codes.

The memory device may be configured to store a function group including all or some functions included in one of the multiple binary codes, the memory controller may load a binary code including a first function called at a first timepoint into a first memory area at a second timepoint preceding the first timepoint based on call path information indicating a relationship among the functions included in the function group and call probability information of the respective functions included in the function group.

The memory controller may be configured to generate the call path information of functions included in the function group on the basis of a result of static analysis of the function group.

The memory controller may be configured to measure call frequencies of the respective functions included in the function group during runtime and may update the call probability information regarding the respective functions included in the function group.

The memory controller may be configured to load the binary code including the first function into the first memory area at the first timepoint when a probability that the first function will be called is equal to or greater than a threshold probability.

When the size of free space in the first memory area is less than the size of the binary code including the first function at the second timepoint, the memory controller may be configured to evict at least one of eviction candidate binary codes from the first memory area, the eviction candidate binary codes being binary codes already loaded into the first memory area at the second timepoint.

The memory controller may be configured to copy the binary code including the first function to a second memory area which is different from the first memory area, in order to execute the first function.

According to another aspect of the present invention, embodiments provide a memory controller including a memory interface configured to communicate with a memory device and a control circuit configured to control the memory device.

The memory device may store firmware including multiple binary codes.

The control circuit may be configured to store a function group including all or some functions included in one of the multiple binary codes, the control circuit may be configured to load a binary code including a first function called at a first timepoint into a first memory area at a second timepoint preceding the first timepoint based on i) information indicating a call path between functions included in the function group and ii) call probability information of the respective functions included in the function group.

The control circuit may be configured to generate the call path information of functions included in the function group on the basis of a result of static analysis of the function group.

The control circuit may be configured update the call probability information regarding the respective functions included in the function group according to call frequencies of the respective functions included in the function group during runtime.

The control circuit may be configured to load the binary code including the first function into the first memory area at the first timepoint when a probability that the first function will be called is equal to or greater than a threshold probability.

When the size of a free space of the first memory area is less than the size of the binary code including the first function at the second timepoint, the control circuit may be configured to evict at least one of eviction candidate binary codes from the first memory area, the eviction candidate binary codes being binary codes already loaded into the first memory area at the second timepoint.

The control circuit may be configured to copy the binary including the first function to a second memory area which is different from the first memory area, in order to execute the first function.

According yet to another aspect of the present invention, embodiments provide a method for operating a memory system configured to control a memory device.

The memory device may store firmware including multiple binary codes.

The method for operating a memory system may include a step of determining a function group including all or some functions included in one of the multiple binary codes stored in the memory device.

The method for operating a memory system may include a step of loading a binary code including a first function called at a first timepoint into a first memory area at a second timepoint preceding the first timepoint based on information indicating a call path between functions included in the function group and call probability information of the respective functions included in the function group.

The Information indicating a call path between functions included in the function group may be generated on the basis of a result of static analysis of the function group.

The binary code including the first function may be loaded into the first memory area at the second timepoint when a probability that the first function will be called is equal to or greater than a threshold probability.

When the size of a free space of the first memory area is less than the size of the binary code including the first function at the second timepoint, at least one of eviction candidate binary codes may be evicted from the first memory area, the eviction candidate binary codes being binary codes already loaded into the first memory area at the second timepoint.

The binary code including the first function may be copied to a second memory area which is different from the first memory area, when the first function is executed.

According yet to another aspect of the present invention, embodiments provide a memory system including a memory device and a controller.

The memory device may be configured to store plural codes each having one or more functions.

The controller may be configured to cache one or more among the stored codes thereby executing the functions of the cached codes to control the memory device to perform an operation.

The controller may cache, before an inferior function is determined to be executed, a code having the inferior function when a superior function is executed.

The inferior function may have a predetermined historical ration or greater of being called by the superior function when the superior function is executed.

According to an embodiment of the present invention, the operation delay time of the memory system may be minimized.

In addition, according to an embodiment of the present invention, an overhead occurring in the process of calling a specific function may be minimized.

BRIEF DESCRIPTION OF THE DRAWINGS

The above and other aspects, features and advantages of the present invention disclosure will be more apparent from the following detailed description taken in conjunction with the accompanying drawings, in which.

DETAILED DESCRIPTION

Figure 1:
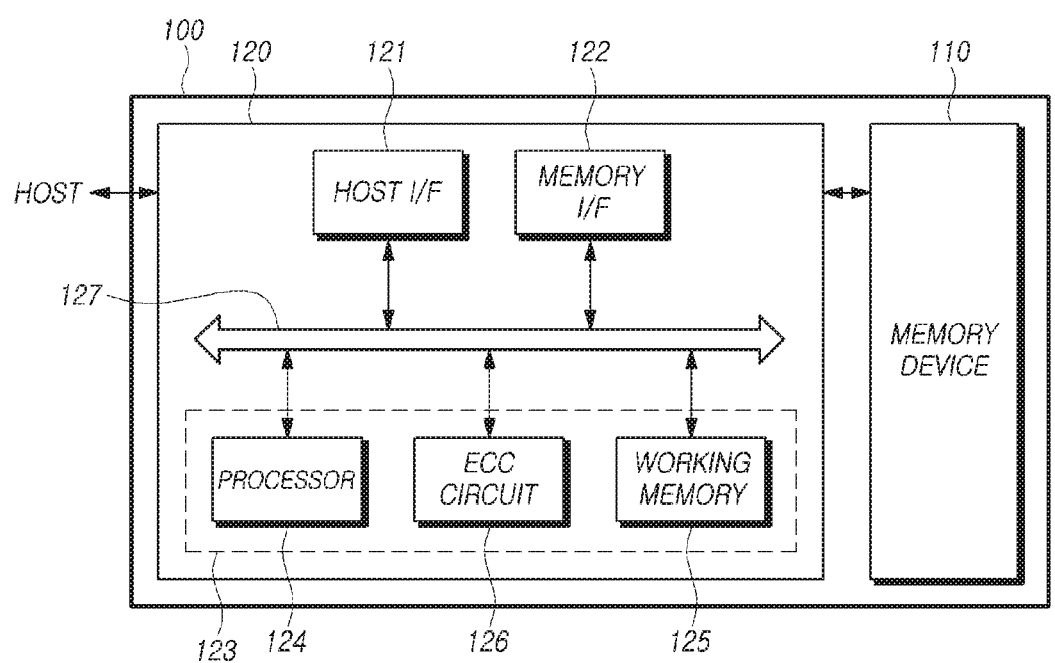
FIG. 1 is a diagram illustrating a schematic configuration of a memory system according to an embodiment of the present invention disclosure.

Hereinafter, some embodiments of the present invention disclosure will be described in detail with reference to the accompanying illustrative drawings. In designating elements of the drawings by reference numerals, the same elements will be designated by the same reference numerals although they are shown in different drawings. Further, in the following description of the present invention disclosure, a detailed description of known functions and configurations incorporated herein may be omitted for avoiding obscuring the disclosure of the invention.

It should be understood that the drawings are simplified schematic illustrations of the described devices and may not include well known details for avoiding obscuring the features of the invention.

It should also be noted that features present in one embodiment may be used with one or more features of another embodiment without departing from the scope of the invention.

Hereinafter, embodiments of the present invention disclosure will be described in detail with reference to the accompanying drawings.

FIG. 1 is a diagram illustrating the schematic configuration of a memory system 100 according to an embodiment of the present invention disclosure.

Referring to FIG. 1, the memory system 100 according to an embodiment of the present invention disclosure may include a 1o memory device 110 configured to store data, and a memory controller 120 configured to control the memory device 110.

The memory device 110 may include multiple memory blocks. The memory device 110 may be configured to operate in response to control signals received from the memory controller 120. Operations of the memory device 110 may include, for example, a read operation, a program operation (also referred to as a "write operation"), an erasure operation, and the like.

The memory device 110 may include a memory cell array including multiple memory cells (also simply referred to as "cells") configured to store data. The memory cell array may exist inside a memory block.

For example, the memory device 110 may be implemented in various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Embodiments of the present invention disclosure are applicable not only to a flash memory device having an electric charge storage layer configured as a conductive floating gate, but also to a flash memory device having a charge trap flash (CTF) having an electric charge storage layer configured as an insulating film.

The memory device 110 may be configured to receive a command and an address from the memory controller 120 and to access an area of the memory cell array, which is selected by the address. That is, the memory device 110 may perform an operation corresponding to the received command in a memory area of the memory device having a physical address corresponding to the received address from the controller.

For example, the memory device 110 may perform a program operation, a read operation, an erasure operation, and the like. In relation thereto, during the program operation, the memory device 110 may program data in the area selected by the address. During the read operation, the memory device 110 may read data from the area selected by the address. During the erasure operation, the memory device 110 may erase data stored in the area selected by the address.

The memory controller 120 may control write (program), read, erasure, and background operations with regard to the memory device 110. The background operation may include, for example, at least one among a garbage collection operation (GC), a wear leveling (WL) operation, and a bad block management (BBM) operation.

The memory controller 120 may control the operation of the memory device 110 at the request of a host. Alternatively, the memory controller 120 may control the operation of the memory device 110 without a corresponding request of the host, such as, for example, when it performs one or more background operations of the memory device.

The memory controller 120 and the host may be separate devices. In some cases, the memory controller 120 and the host may be integrated and implemented as a single device. In the following description, the memory controller 120 and the host are separate devices.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be connected to the memory device 110 to provide an interface for communication with the memory device 110. That is, the memory interface 122 may be configured to provide the memory device 110 and the memory controller 120 with an interface in response to a control of the control circuit 123.

The control circuit 123 may be configured to control the operation of the memory device 110 by performing operations for an overall control of the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may perform a function of a flash translation layer (FTL). The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, according to the mapping unit. Typical address mapping methods may include a page mapping method, a block mapping method, and a hybrid mapping method.

The processor 124 may be configured to randomize data received from the host HOST. For example, the processor 124 may randomize data received from the host HOST by using a randomizing seed. The randomized data is provided to the memory device 110 as data to be stored, and is programmed in the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) so as to control the operation of the memory controller 120. In other words, the processor 124 may control the overall operation of the memory controller 120 and, in order to perform a logical operation, may execute (drive) firmware loaded into the working memory 125 during booting.

The firmware refers to a program executed inside the memory system 100, and may include various functional layers.

For example, the firmware may include at least one of a flash translation layer (FTL) configured to translate between a logical address that the host HOST requests the memory system 100 to provide and a physical address of the memory device 110, a host interface layer (HIL) configured to interpret a command that the host HOST issues to the memory system 100 (storage device) and to deliver the same to the FTL, and a flash interface layer (FIL) configured to deliver a command issued by the FTL to the memory device 110.

For example, the firmware may be stored in the memory device 110, then loaded into the working memory 125.

The working memory 125 may store firmware, program codes, commands, or pieces of data necessary to drive the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect an error bit of check target data by using an error correction code, and to correct the detected error bit. For example, the check target data may be data stored in the working memory 125, data retrieved from the memory device 110, or the like.

The error detection/correction circuit 126 may be implemented to decode data by using the error correction code. The error detection/correction circuit 126 may be implemented by using various code decoders. For example, a decoder that performs nonsystematic code decoding or a decoder that performs systematic code decoding may be used.

For example, the error detection/correction circuit 126 may detect an error bit, sector by sector, with regard to each piece of read data. That is, each piece of read data may include multiple sectors. As used herein, a sector may refer to a data unit smaller than the read unit (page) of a flash memory. Sectors constituting each piece of read data may correspond to each other via an address.

The error detection/correction circuit 126 may calculate a bit error rate (BER) and determine whether or not correction can be made sector by sector. For example, if the BER is higher than a reference value, the error detection/correction circuit 126 may determine that the corresponding sector is uncorrectable or "a fail". If the BER is lower than the reference value, the error detection/correction circuit 126 may determine that the corresponding sector is correctable or "a pass".

The error detection/correction circuit 126 may perform error detection and correction operations successively with regard to all pieces of read data. When a sector included in the read data is correctable, the error detection/correction circuit 126 may omit the error detection and correction operations related to the corresponding sector with regard to the next piece of read data. After finishing error detection and correction operations with regard to all pieces of read data in this manner, the error detection/correction circuit 126 may detect a sector deemed uncorrectable to the end. There may be one or more sectors deemed uncorrectable. The error detection/correction circuit 126 may deliver information (for example, address information) regarding the sectors deemed uncorrectable to the processor 124.

The bus 127 may be configured to provide a channel between the constituent elements 121, 122, 124, 125, and 126 of the memory controller 120. The bus 127 may include, for example, a control bus for delivering various kinds of control signals and commands, and a data bus for delivering various kinds of data.

The above-mentioned constituent elements 121, 122, 124, 125, and 126 of the memory controller 120 are only provided as examples. It is noted that some of the above-mentioned constituent elements 121, 122, 124, 125, and 126 of the memory controller 120 may be omitted, or some of the above-mentioned constituent elements 121, 122, 124, 125, and 126 of the memory controller 120 may be integrated into a single element. Also, in some cases, one or more other constituent elements may be added, in addition to the above-mentioned constituent elements of the memory controller 120.

Hereinafter, the memory device 110 will be described in more detail with reference to FIG. 2.

Figure 2:
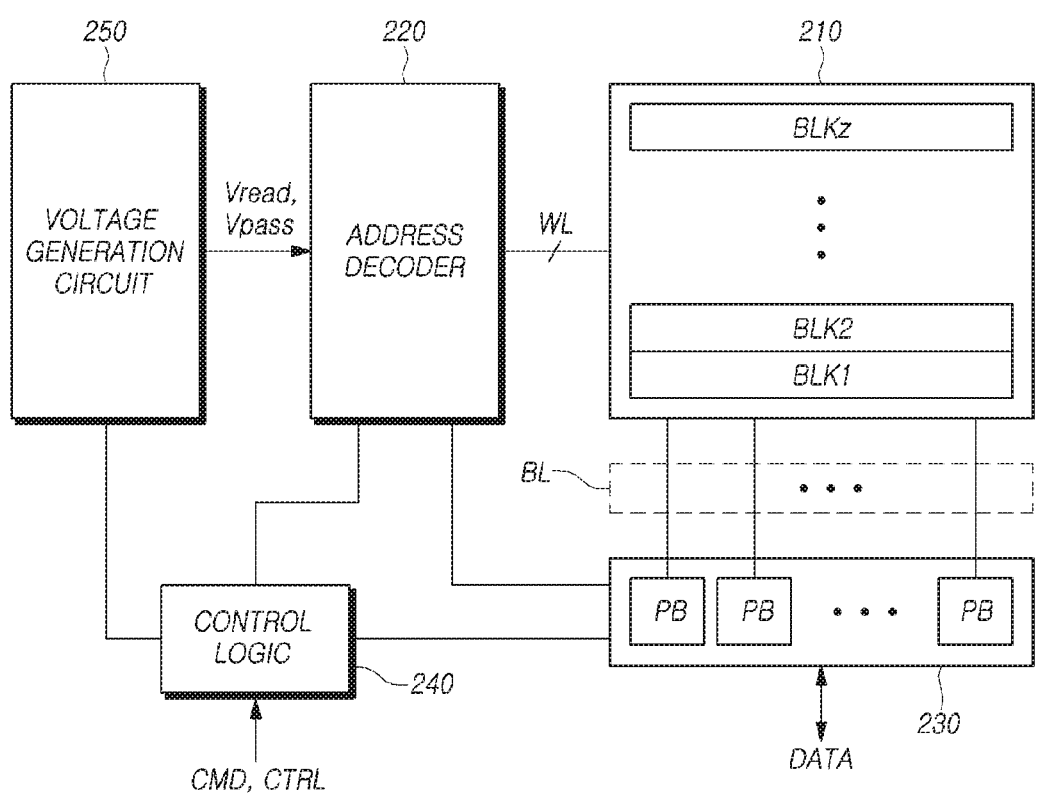
FIG. 2 is a block diagram schematically illustrating a memory device according to an embodiment of the present invention disclosure.

FIG. 2 is a block diagram schematically illustrating a memory device 110 according to an embodiment of the present invention disclosure.

Referring to FIG. 2, the memory device 110 according to an embodiment of the present invention disclosure may include a memory cell array 210, an address decoder 220, a read/write circuit 230, a control logic 240, and a voltage generation circuit 250.

The memory cell array 210 may include multiple memory blocks BLK1-BLKz (z is a natural number equal to or larger than 2).

In the multiple memory blocks BLK1-BLKz, multiple word lines WL and multiple bit lines BL may be disposed, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells, and may include nonvolatile memory cells having a vertical channel structure.

The memory cell array 210 may be configured as a memory cell array having a two-dimensional structure and, in some cases, may be configured as a memory cell array having a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data. As another example, each of the multiple memory cells included in the memory cell array 210 may be a triple-level cell (TLC) configured to store three bits of data. As another example, each of the multiple memory cells included in the memory cell array 210 may be a quad-level cell (QLC) configured to store four bits of data. As another example, the memory cell array 210 may include multiple memory cells, each of which may be configured to store at least five bits of data.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to a control of the control logic 240.

The address decoder 220 may receive addresses through an input/output buffer inside the memory device 110. The address decoder 220 may be configured to decode a block address among the received addresses. The address decoder 220 may select at least one memory block according to the decoded block address.

The address decoder 220 may receive a read voltage Vread and a pass voltage Vpass from the voltage generation circuit 250.

The address decoder 250 may apply the read voltage Vread to a selected word line WL inside a selected memory block, during an operation of applying the read voltage during a read operation, and may apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line according to the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that is in charge of a data processing function and, in some cases, may further include a cache buffer in charge of a caching function.

The multiple page buffers PB may be connected to the memory cell array 210 through the multiple bit lines BL. In order to sense the threshold voltage Vth of the memory cells during a read operation and a program verification operation, the multiple page buffers PB may continuously supply a sensing current to the bit lines BL connected to the memory cells, may sense, through a sensing node, a change in the amount of current that flows according to the program state of a corresponding memory cell, and may latch the same as sensing data.

The read/write circuit 230 may operate in response to page buffer control signals output from the control logic 240.

During a read operation, the read/write circuit 230 senses data in a memory cell, temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the pre-charge potential level of sensing nodes of multiple page buffers PB.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

Figure 3:
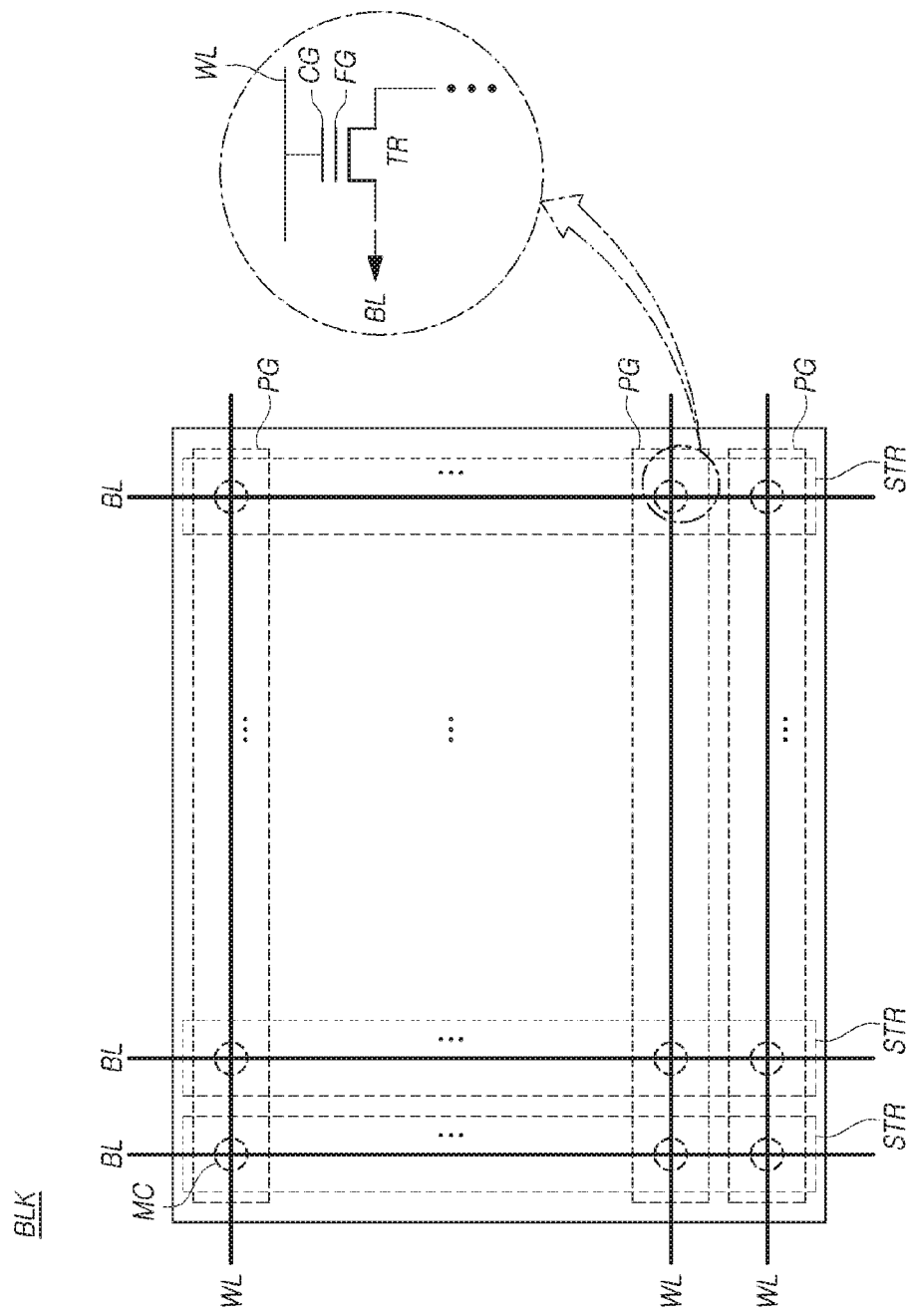
FIG. 3 is a diagram schematically illustrating a memory block of a memory device according to an embodiment of the present invention disclosure.

FIG. 3 is a diagram schematically illustrating a memory block BLK of a memory device 110 according to an embodiment of the present invention disclosure.

Referring to FIG. 3, a memory block BLK included in the memory device 110 may be arranged and configured in such direction that multiple pages PG and multiple strings TTR intersect.

The multiple pages PG correspond to multiple word lines WL, and the multiple strings STR correspond to multiple bit lines BL.

In the memory block BLK, multiple word lines WL and multiple bit lines BL may be arranged to intersect. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The multiple word lines WL and the multiple bit lines BL may intersect with each other, thereby defining multiple memory cells MC. Each memory cell MC may have a transistor TR arranged therein.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some cases, at least one dummy word line may be additionally arranged between the first outermost word line and the first selection line. In addition, at least one dummy word line may be additionally arranged between the second outermost word line and the second selection line.

In the case of a memory block structure as illustrated in FIG. 3, a read operation and a program operation (write operation) may be performed page by page, and an erasure operation may be performed memory block by memory block.

Figure 4:
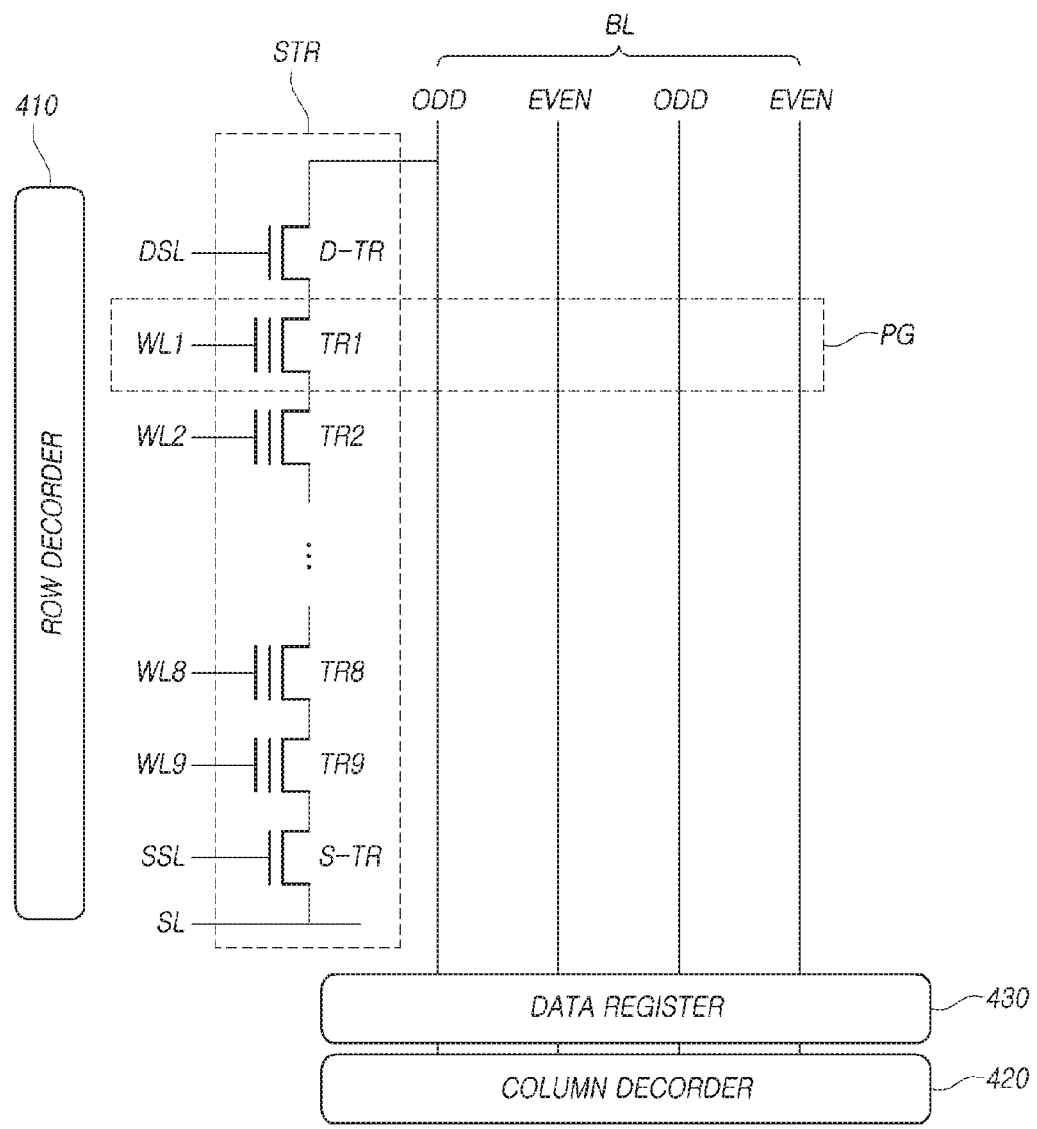
FIG. 4 is a diagram illustrating the structure of word lines and bit lines of a memory device according to an embodiment of the present invention disclosure.

FIG. 4 is a diagram illustrating a structure of word lines WL and bit lines BL of a memory device 110 according to an embodiment of the present invention disclosure.

Referring to FIG. 4, the memory device 110 has a core area in which memory cells MC are concentrated, and an auxiliary area which corresponds to the remaining area other than the core area. The auxiliary area supports the operations of the memory cell array 210.

The core area may include pages PG and strings STR. In the core area, multiple word lines WL1-WL9 and multiple bit lines BL are arranged to intersect.

The word lines WL1-WL9 may be connected to a row decoder 410. The bit lines BL may be connected to a column decoder 420. A data register 430, which corresponds to the read/write circuit 230 of FIG. 2, may exist between the multiple bit lines BL and the column decoder 420.

The multiple word lines WL1-WL9 may correspond to multiple pages PG.

For example, each of the multiple word lines WL1-WL9 may correspond to one page PG as illustrated in FIG. 4. In contrast, when each of the multiple word lines WL1-WL9 has a large size, each of the multiple word lines WL1-WL9 may correspond to at least two (for example, two or four) pages PG. Each page PG is the smallest unit in connection with conducting a program operation and a read operation, and all memory cells MC within the same page PG may perform simultaneous operations when conducting a program operation and a read operation.

The multiple bit lines BL may be connected to the column decoder 420 while being distinguished between odd-numbered bit lines BL and even-numbered bit lines BL.

For accessing a memory cell MC, the address may be entered to the core area first through the input/output end and then through the row decoder 410 and the column decoder 420 such that a corresponding target memory cell can be designated. As used herein, designating a target memory cell refers to accessing one of the memory cells MC at the sites of intersection between the word lines WL1-WL9 connected to the row decoder 410 and the bit lines BL connected to the column decoder 420, for programming data therein or for reading programmed data therefrom.

Pages PG in a first direction (for example, X-axis direction) are bound by a commonly used line referred to as a word line WL, and strings STR in a second direction (for example, Y-axis direction) are bound (connected) by a common line referred to as a bit line BL. As used herein, being commonly bound refers to being structurally connected by the same material and simultaneously receiving the same voltage during voltage application. The voltage applied to a memory cell MC in the middle position or last position among memory cells MC connected in series may slightly differ from the voltage applied to the memory cell MC in the first position and from the voltage applied to the memory cell MC in the last position, due to the voltage drop across the preceding memory cell MC.

The data register 430 plays an essential role because all data processing by the memory device 110, including program and read operations, occurs via the data register 430. If data processing by the data register 430 is delayed, all the other areas need to wait until the data register 430 finishes the data processing. In addition, degradation of performance of the data register 430 may degrade the overall performance of the memory device 110.

Referring to the example illustrated in FIG. 4, in one string STR, multiple transistors TR1-TR9 connected to multiple word lines WL1-WL9 may exist. The areas in which the multiple transistor TR1-TR9 exist correspond to memory cells MC. As used herein, the multiple transistors TR1-TR9 refer to transistors including control gates CG and floating gates FG.

The multiple word lines WL1-WL9 include two outermost word lines WL1 and WL9. A first selection line DSL may be additionally arranged outside the first outermost word line WL1, which is closer to the data register 430 in terms of the signal path among the two outermost word lines WL1 and WL9, and a second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR plays the role of a switch that turns on or off the connection between the corresponding string STR and the data register 430. The second selection transistor S-TR plays the role of a switch that turns on or off the connection between the corresponding string STR and the source line SL. That is, the first selection transistor D-TR and the second selection transistor S-TR play the role of gatekeepers which are positioned on both ends of the corresponding string STR and deliver/block signals.

The memory system 100 needs to fill the target memory cell MC of the bit line BL to be programmed with electrons during a program operation. Accordingly, the memory system 100 applies a predetermined turn-on voltage Vcc to the gate electrode of the first selection transistor D-TR, thereby turning on the first selection transistor D-TR, and applies a predetermined turn-off voltage (for example, 0V) to the gate electrode of the second selection transistor S-TR, thereby turning off the second selection transistor S-TR.

The memory system 100 turns on both the first selection transistor D-TR and the second selection transistor S-TR during a read operation or a verification operation. Accordingly, an electric current may flow through the corresponding string STR and drain to the source line SL, which corresponds to the ground, such that the voltage level of the bit line BL can be measured. However, during a read operation, there may be a time difference in on/off timing between the first selection transistor D-TR and the second selection transistor S-TR.

The memory system 100 may supply a predetermined voltage (for example, +20V) to the substrate through a source line SL during an erasure operation. The memory system 100 floats both the first selection transistor D-TR and the second selection transistor S-TR during an erasure operation, thereby generating an infinite resistance. As a result, the role of the first selection transistor D-TR and that of the second selection transistor S-TR may be removed, and electrons may operate only between the floating gate FG and the substrate due to the potential difference.

Figure 5:
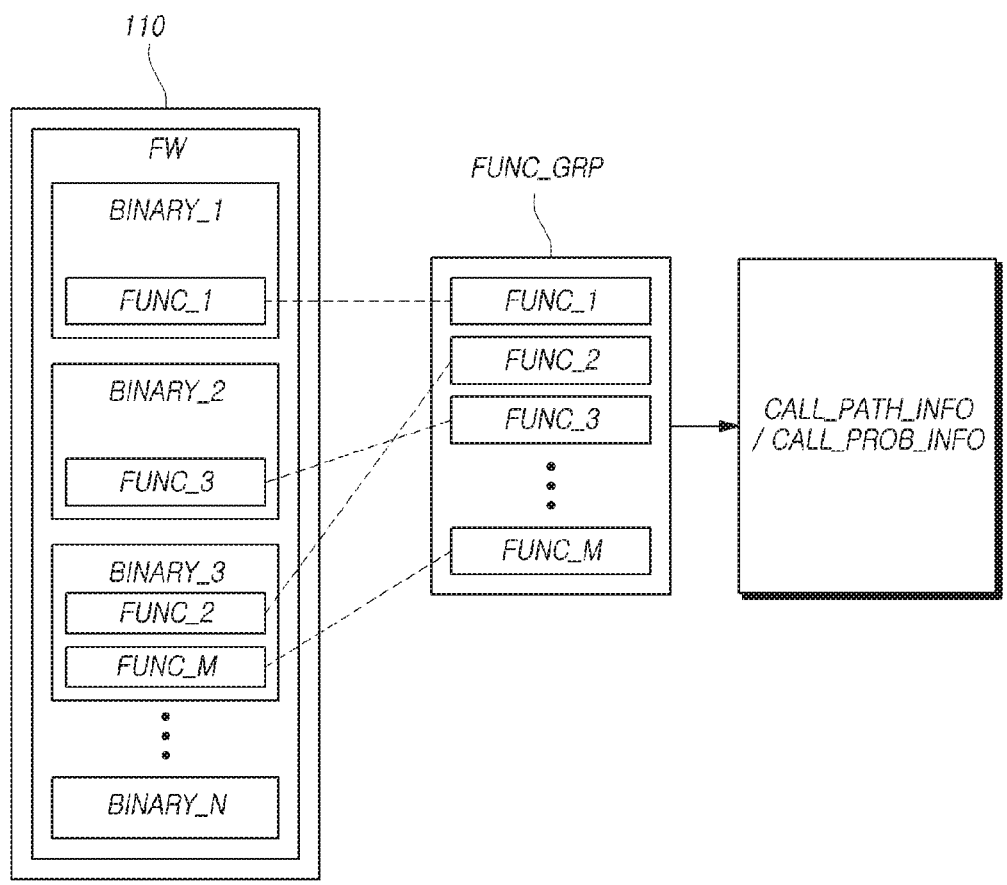
FIG. 5 is a diagram schematically illustrating an operation of a memory system according to an embodiment of the present invention disclosure.
Figure 6:
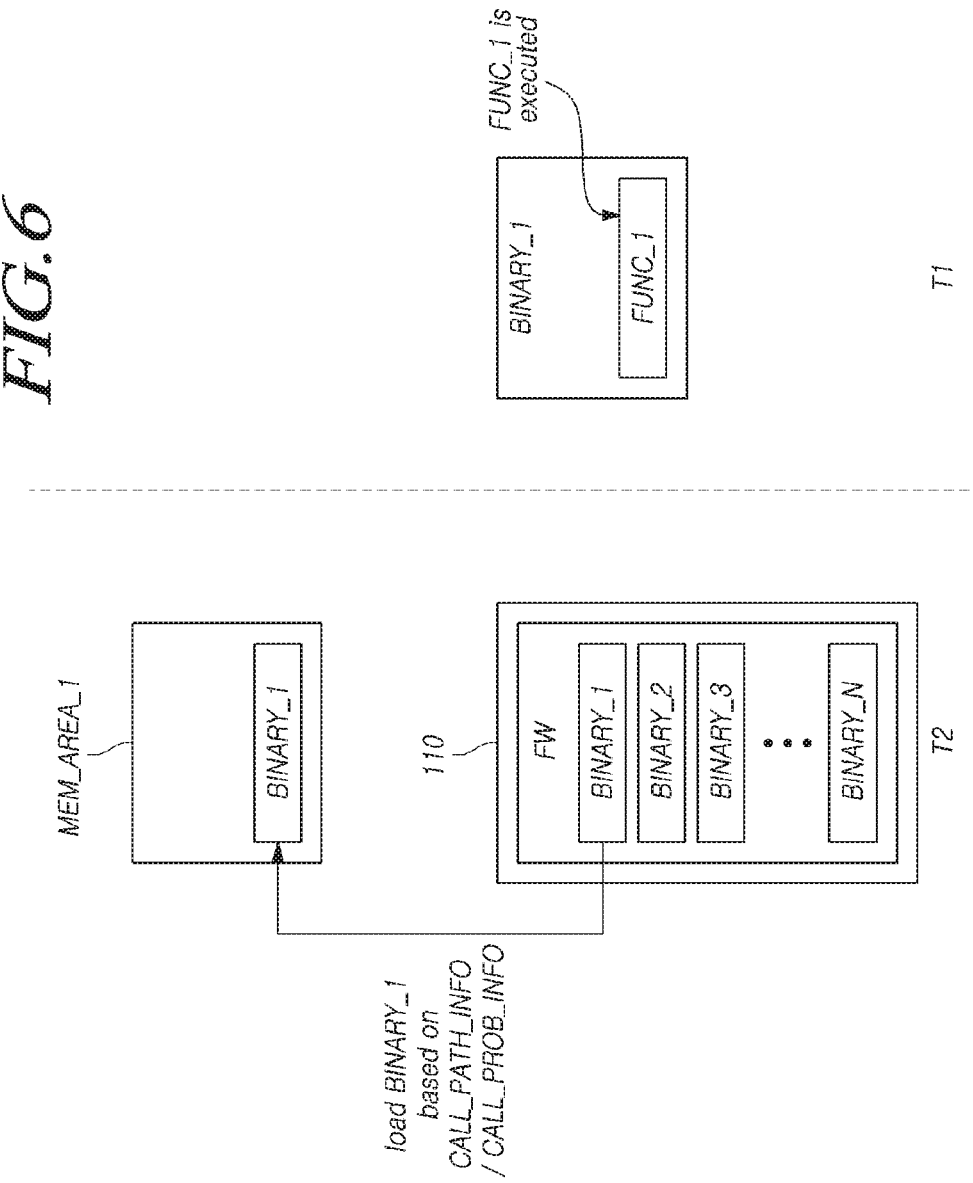
FIG. 6 is a diagram schematically illustrating an operation of a memory system according to an embodiment of the present invention disclosure.

FIGS. 5 and 6 illustrate an operation of a memory system 100 according to an embodiment of the present invention disclosure.

Referring to FIG. 5, the memory device 110 of the memory system 100 may store multiple binary codes BINARY_1, BINARY_2, BINARY_3, . . . , BINARY_N. The above-mentioned multiple binary codes BINARY_1, BINARY_2, BINARY_3, . . . , BINARY_N may be parts constituting the firmware FW described with reference to FIG. 1. As used herein, the binary codes may also be referred to as binaries, modules, units, or packages.

A reason firmware FW is divided into multiple binary codes and then stored in the memory device 110 is as follows. For the memory controller 120 to drive firmware FW, the firmware FW needs to be loaded in the working memory 125 as described above with reference to FIG. 1. To load the entire firmware FW into the working memory 125, the storage capacity of the working memory 125 needs to be equal to or larger than the entire size of the firmware FW. This may cause a problem in that the cost for the working memory 125 increases in proportion to the size of the firmware FW.

Therefore, the firmware FW may include multiple binary codes, and the memory controller 120 may load only some of the binary codes included in the firmware FW into the working memory 125. In this case, the memory controller 120 does not need to secure a storage capacity equal to or larger than the entire size of the firmware FW in the working memory 125, in order to drive the firmware FW, consequently reducing the cost necessary for the working memory 125.

That is, if only some of the multiple binary codes included in the firmware FW are dynamically loaded into the working memory 125 during runtime, the working memory 125 can be used efficiently, thereby reducing the cost necessary for the working memory 125. This technique may be referred to as a runtime overlay technique.

With regard to the above-mentioned multiple binary codes BINARY_1, BINARY_2, BINARY_3, . . . , BINARY_N, the memory controller 120 of the memory system 100 may determine a function group FUNC_GRP including all or some of functions included in one of the multiple binary codes BINARY_1, BINARY_2, BINARY_3, . . . , BINARY_N.

In FIG. 5, the function group FUNC_GRP includes functions FUNC_1, FUNC_2, FUNC_3, . . . , FUNC_M, and each of the functions FUNC_1, FUNC_2, FUNC_3, . . . , FUNC_M included in the function group FUNCTION_GRP is included in one of the multiple binary codes BINARY_1, BINARY_2, BINARY_3, . . . , BINARY_N. Specifically, in FIG. 5, function FUNC_1 is included in binary code BINARY_1, function FUNC_2 is included in binary code BINARY_3, function FUNC_3 is included in binary code BINARY_2, and function FUNC_4 is included in binary code BINARY_3.

With regard to the above-mentioned function group FUNC_GRP, the memory controller 120 may generate i) call path information CALL_PATH_INFO of the functions FUNC_1, FUNC_2, FUNC_3, . . . , FUNC_M included in the function group FUNC_GRP and ii) call probability information CALL_PROB_INFO regarding respective functions FUNC_1, FUNC_2, FUNC_3, . . . , FUNC_M included in the function group FUNC_GRP.

As used herein, the information regarding call paths between functions (also referred to hereinafter as "call hierarchy information of functions") may refer to information indicating a superior function that needs to be called first in order for a specific function to be called (executed), and a lower-level function that can be called after the specific function is called.

In other words, the call path information of functions refers to information indicating a relationship of the functions. For example, a superior function of an inferior function may directly call the inferior function. The call path information will be described with reference to FIG. 7.

For example, the call path information of functions may refer to information indicating that, if a function main ( ) is executed, the function main( ) may call a function A( ), which is an inferior function of the superior function main( ); and when the function A( ) is executed due to the call of the function main( ), the function A( ) may call a function B( ), which is an inferior function of the superior function A( ).

Such call path information of functions may be expressed through various material structures.

For example, the call path information of functions may be expressed as a graph which i) expresses each function as a node and ii) expresses the call relation between respective functions as an edge having a direction. Existence of edge (A, B) with regard to nodes A and B of the graph means that function A can call function B.

As another example, the call path information of functions may be expressed by material structures such as a tree or a table.

The call probability information of a function indicates the probability that the function will be called when a superior function of the function is executed. A superior function of an inferior function directly calls the inferior function. For example, if a function main( ) calls a function A( ), and if the function A( ) calls a function A'( ), then the function main ( ) is the superior function to the function A( ), and the function A( ) is the superior function to the function A'( ). The call probability information of the function A( ) is the probability that the function A( ) will be called when the superior function main( ) is executed. The call probability information of the function A'( ) is the probability that the function A'( ) will be called when the superior function A( ) is executed.

In the following description of embodiments of the present invention disclosure, the probability that a specific function will be called may be obtained when the superior function related to the corresponding specific function has been called.

For example, if a function main ( ) is executed, a function A( ) and a function B( ) that are inferior functions of the superior function main( ) may have a chance to be called. Furthermore, by utilizing a call history in which the function A( ) is called six times and the function B( ) is called eight times when main ( ) is executed ten times, the call probability of the function A( ) can be determined to be 60%, and the call probability of the function B( ) can be determined to be 80%.

In FIG. 6, the memory controller 120 may load binary code BINARY_1 stored in the memory device 110 into the first memory area MEM_AREA_1 on the basis of the above-mentioned call path information CALL_PATH_INFO and call probability information CALL_PROB_INFO.

The position of the first memory area MEM_AREA_1 may be variously determined. For example, the first memory area MEM_AREA_1 may be positioned in the working memory 125 inside the memory controller 120. As another example, the first memory area MEM_AREA_1 may be positioned in a device positioned outside the memory controller 120.

The binary code BINARY_1 loaded into the first memory area MEM_AREA_1 may include a first function FUNC_1 called at a first timepoint T1 among functions included in the function group FUNC_GRP.

The memory controller 120 may load the binary code BINARY_1 including the first function FUNC_1 into the first memory area MEM_AREA_1 at a second timepoint T2 that precedes the first timepoint T1. That is, the memory controller 120 may preload the binary code BINARY_1 including the first function FUNC_1 into the first memory area MEM_AREA_1 at a timepoint earlier than the timepoint at which the first function FUNC_1 is called.

Instead of loading the binary code including a function when the timepoint arrives for the memory controller 120 to call the function, the binary code including the function is preloaded earlier than the timepoint at which the function is called.

The memory device 110 has multiple binary codes stored therein as described above. Therefore, if the binary code including a function is loaded at the timepoint at which the memory controller 120 calls the function, it takes a time for the memory device 110 to read the corresponding binary code.

There may be no problem if the function is hardly affected by the execution time, but the overall performance of the memory system 100 may be heavily influenced if the function performs an operation that is critical to the execution time.

Accordingly, the memory controller 120 may preload the binary code including the function before the function is called, thereby reducing the delay time necessary to call the function.

However, if a binary code including a function has been preloaded, and if the corresponding function is not actually called later, the actual delay time may not be reduced, and an overhead may unnecessarily occur in the process of loading the binary code including the function. In this case, the overall performance of the memory system 100 is degraded, and there is no merit of preloading the binary code.

Therefore, the memory controller 120 may preload the binary code including the corresponding function only if the corresponding function is highly likely to be called. The memory controller 120 may use the above-mentioned call path information CALL_PATH_INFO and call probability information CALL_PROB_INFO in order to determine the possibility that the corresponding function will be called as described above.

Hereinafter, embodiments for generating the above-mentioned call path information CALL_PATH_INFO and call probability information CALL_PROB_INFO by the memory controller 120 will be described in detail with reference to FIG. 7 to FIG. 9.

An embodiment for generating the above-mentioned call path information CALL_PATH_INFO by the memory controller 120 will be described first.

Figure 7:
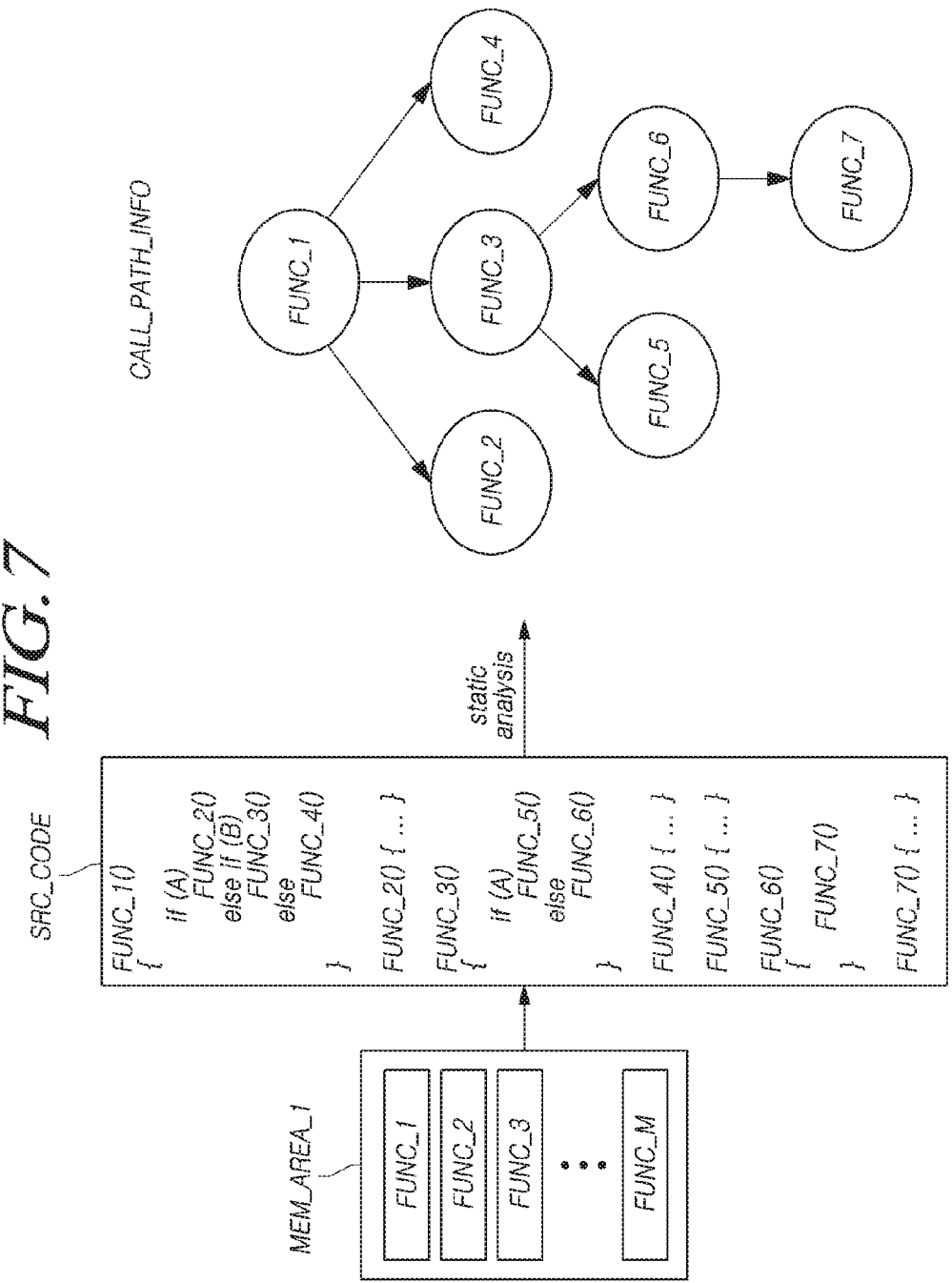
FIG. 7 is a diagram illustrating an operation of generating call path information in a memory system according to an embodiment of the present invention disclosure.

FIG. 7 is a diagram illustrating an example of generating the call path information CALL_PATH_INFO in a memory system 100 according to an embodiment of the present invention disclosure.

Referring to FIG. 7, the memory controller 120 of the memory system 100 may generate call path information CALL_PATH_INFO of functions FUNC_1, FUNC_2, FUNC_3, . . . , FUNC_M included in a function group FUNC_GRP on the basis of the result of static analysis of the function group FUNC_GRP.

The static analysis of the function group FUNC_GRP is conducted while functions included in the function group FNC_GRP are not actually called. Therefore, instead of directly performing static analysis of the function group FUNC_GRP, the memory controller 120 uses the result of static analysis conducted outside the memory system 100.

The static analysis of the function group FUNC_GRP may be conducted through a source code regarding the functions included in the function group FUNC_GRP or through a binary code file including the functions included in the function group FUNC_GRP.

The result of static analysis of the function group FUNC_GRP may be stored in the memory device 110, the working memory 125, or the like inside the memory system 100 according to a command from a test device or the host HOST.

Hereinafter, an example of generating, in a graph type, call path information CALL_PATH_INFO of the functions FUNC_1, FUNC_2, FUNC_3, . . . , FUNC_M included in the function group FUNC_GRP on the basis of a source related to the functions included in the function group FUNC_GRP, will be described in detail.

In FIG. 7, the source code SRC_CODE of the functions included in the function group FUNC_GRP may show the following call path among the functions.

When a function FUNC_1 is executed, a conditional statement may be executed such that one of a function FUNC_2, a function FUNC_3, and a function FUNC_4 may be called. Specifically, if a condition A is satisfied, the function FUNC_2 is called; if the condition A is not satisfied, and if a condition B is satisfied, the function FUNC_3 is called; and if both the conditions A and B are not satisfied, the function FUNC_4 is called.

In addition, if the function FUNC_3 is executed due to the call from the function FUNC_1, a conditional statement may be executed such that one of a function FUNC_5 and a function FUNC_6 may be called. Specifically, if a condition A is satisfied, the function FUNC_5 is called, and if the condition A is not satisfied, the function FUNC_6 is called.

In addition, if the function FUNC_6 is executed due to the call from the function FUNC_3, a function FUNC_7 may be called. Since there is no conditional statement in this case, the function FUNC_7 is necessarily called if function FUNC_6 is executed.

The call path information CALL_PATH_INFO of functions included in the function group FUNC_GRP generated on the basis of the source code SRC_CODE described above may be expressed as a graph as follows.

Specifically, if the function FUNC_1 is executed, one of the functions FUNC_2, FUNC_3, and FUNC_4 may be called according to the condition. Accordingly, the graph includes an edge between the nodes FUNC_1 and FUNC_2, an edge between the nodes FUNC_1 and FUNC_3, and an edge between the nodes FUNC_1 and FUNC_4.

In addition, if function FUNC_3 is executed, one of the functions FUNC_5 and FUNC_6 may be called according to the condition. Accordingly, the graph includes an edge between the nodes FUNC_3 and FUNC_5 and an edge between the nodes FUNC_3 and FUNC_6.

Lastly, if function FUNC_6 is executed, the function FUNC_7 is called. Accordingly, the graph includes an edge between the nodes FUNC_6 and FUNC_7.

Hereinafter, an embodiment for generating the above-mentioned call probability information CALL_PROB_INFO by the memory controller 120 will be described.

Figure 8:
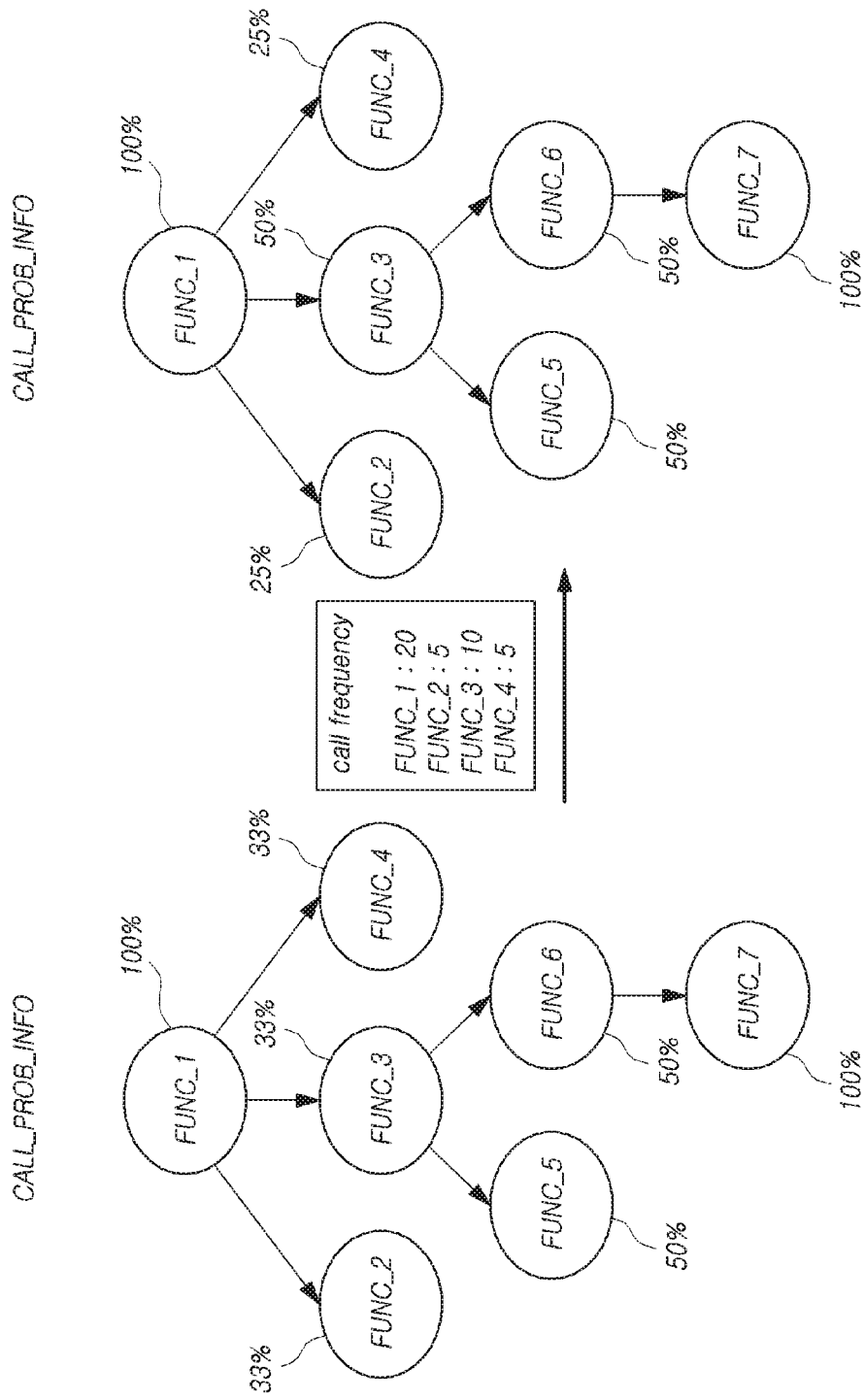
FIG. 8 is a diagram illustrating an operation of generating function call probability information in a memory system according to an embodiment of the present invention disclosure.
Figure 9:
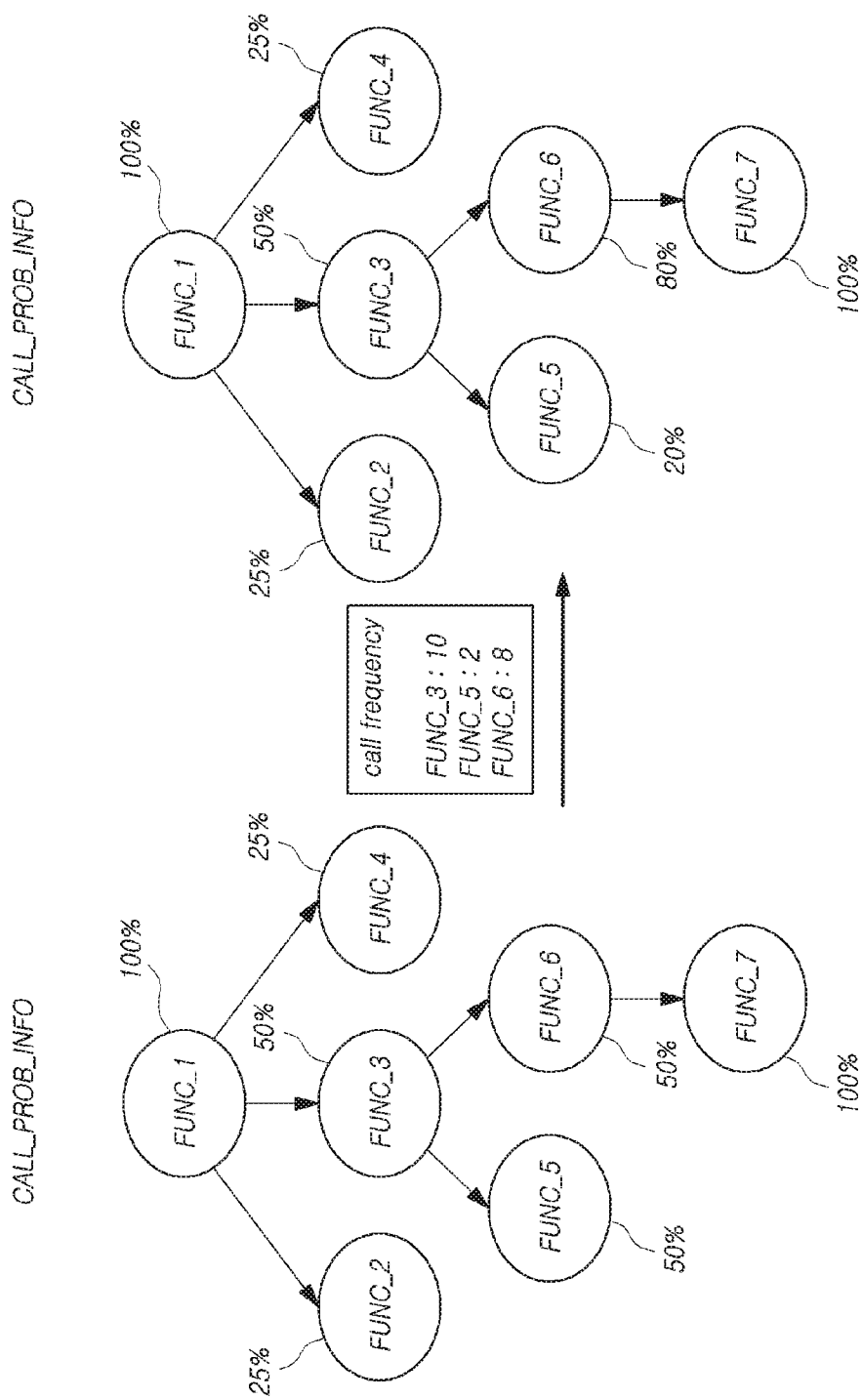
FIG. 9 is a diagram illustrating an operation of generating function call probability information in a memory system according to an embodiment of the present invention disclosure.

FIG. 8 is a diagram illustrating an operation of generating function call probability information CALL_PROB_INFO in a memory system 100 according to an embodiment of the present invention disclosure, and FIG. 9 is a diagram illustrating an operation of generating function call probability information CALL_PROB_INFO in a memory system 100 according to an embodiment of the present invention disclosure.

Unlike the case described with reference to FIG. 7 wherein the call path information CALL_PATH_INFO is determined on the basis of statistic analysis of a function group FUNC_GRP, the call probability information CALL_PROB_INFO cannot be determined on the basis of the result of statistic analysis. This is because it is impossible to know the probability that each function will be called until the function is actually called.

For example, if the function FUNC_1 is executed in FIG. 7, the result of static analysis of the source code indicates that one of the functions FUNC_2, FUNC_3, AND FUNC_4 is called, but does not indicate the frequency at which conditional statements A and B are satisfied.

Therefore, in order for the memory controller 120 of the memory system 100 to obtain the call probability information CALL_PROB_INFO of each function included in the function group FUNC_GRP, the call frequency of each function included in the function group FUNC_GRP needs to be measured directly at the timepoint of driving of the memory system 100 (that is, during a runtime).

Referring to FIG. 8 and FIG. 9, the memory controller 120 of the memory system 100 may measure, during a runtime, the call frequency of respective functions FUNC_1, FUNC_2, FUNC_3, . . . , FUNC_M included in the function group FUNC_GRP described above, thereby updating call probability information regarding respective functions FUNC_1, FUNC_2, FUNC_3, . . . , FUNC_M included in the function group FUNC_GRP.

Referring to FIG. 8 first, since the call frequency of each function has not yet been measured in the initial step, the memory controller 120 may determine the call probability information CALL_PROB_INFO of each function included in the function group FUNC_GRP when each function has a uniform call frequency.

For example, when function FUNC_1 is executed, the probability that each of functions FUNC_2, FUNC_3, and FUNC_4 will be called may be evenly determined: 1/3=33%. Likewise, when the function FUNC_3 is executed, the probability that each of functions FUNC_5 and FUNC_6 will be called may be evenly determined: 1/2=50%.

Thereafter, at the timepoint of driving of the memory system 100, the function FUNC_2 is called five times, the function FUNC_3 is called ten times, and the function FUNC_4 is called five times while the function FUNC_1 is executed twenty times.

In this case, the probability that the function FUNC_2 will be called may be determined: 5/20=25%; the probability that the function FUNC_3 will be called may be determined: 10/20=50%; and the probability that the function FUNC_4 will be called may be determined: 5/20=25%.

Operations for additionally updating the call probability information CALL_PROB_INFO updated in FIG. 8 will now be described with reference to FIG. 9.

In FIG. 9, after the update as described with reference to FIG. 8, the function FUNC_5 is called two times, and the function FUNC_6 is called eight times while the function FUNC_3 is executed ten times.

In this case, the probability that function FUNC_5 will be called may be determined: 2/10=20%; and the probability that function FUNC_6 will be called may be determined: 8/10=80%. According to an embodiment, the probability that a function will be called by the superior function may be regarded as a historical ratio of the function of being called by the superior function.

As such, the memory controller 120 may check the call frequency of each function of the function group FUNC_GRP during runtime, thereby continuously updating the call probability information CALL_PROB_INFO of each function included in the function group FUNC_GRP, such that more accurate call probability information CALL_PROB_INFO can be calculated over time.

Hereinafter, an operation of determining when to load a binary code including a first function on the basis of the above-mentioned call path information CALL_PATH_INFO and call probability information CALL_PROB_INFO will be described.

Figure 10:
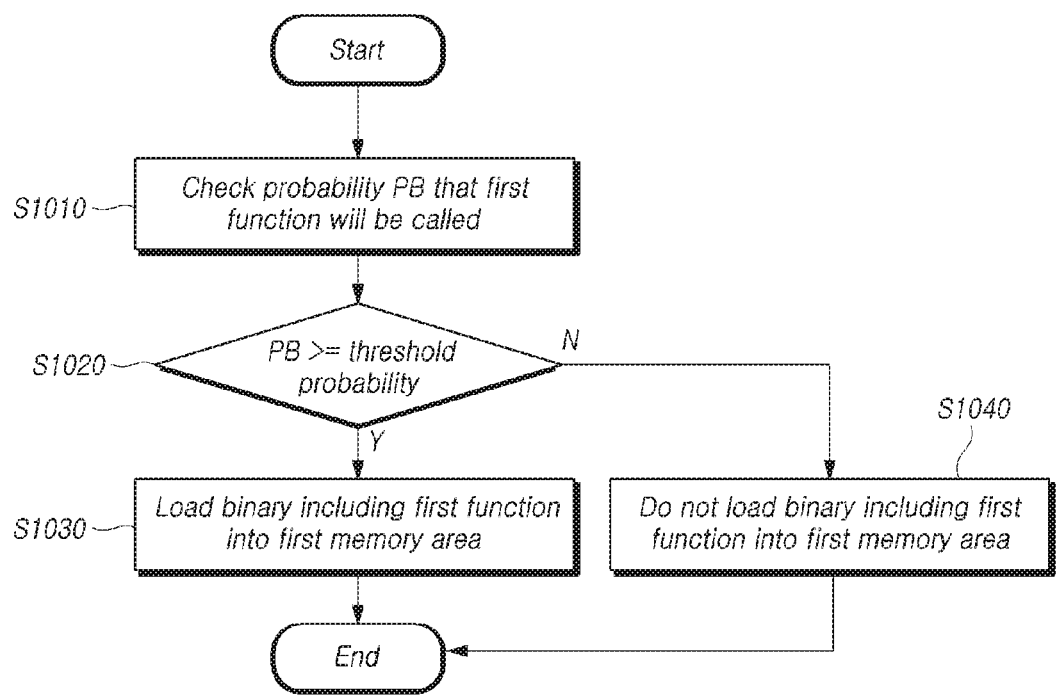
FIG. 10 is a flowchart illustrating a method for an operation according to the call probability of a first function in a memory system according to an embodiment of the present invention disclosure.

FIG. 10 is a flowchart illustrating a method for an operation according to the call probability of a first function in a memory system 100 according to an embodiment of the present invention disclosure.

In FIG. 10, the memory controller 120 of the memory system 100 may check the probability PB that the first function will be called (S1010).

In addition, the memory controller 120 determines whether or not the probability PB that the first function will be called is equal to or larger than a set threshold probability (S1010).

If the PB is equal to or larger than the threshold probability (Y in S1020), the memory controller 120 loads the binary code including the first function into the first memory area (S1030). If the PB is less than the threshold probability (N in S1020), the memory controller 120 does not load the binary code including the first function in the first memory area (S1040).

For example, when the function FUNC_3 has been executed in FIG. 9, the memory controller 120 may check the call probability of the function FUNC_5 and that of the function FUNC_6 on the basis of the call probability information CALL_PROB_INFO of each function.

When the threshold probability is 70%, the call probability of the function FUNC_5 is 20%, which is less than 70%, and the call probability of the function FUNC_6 is 80%, which is greater than 70%. Accordingly, the memory controller 120 may load the binary code including the function FUNC_6 into the first memory area.

The memory controller 120 may preload the binary code including the function FUNC_6 into the first memory area before the function FUNC_6 is called, thereby shortening the time necessary to call the function FUNC_6 in advance. Consequently, this may minimize the operation delay time of the memory system 100.

Furthermore, when a binary code is preloaded into the first memory area MEM_AREA_1 as described above, the size of the free space of the first memory area MEM_AREA_1 continuously decreases over time. This is because, while the existing binary codes including functions are loaded in the first memory area, a new binary code may be additionally loaded into the first memory area when a new function is called.

There may also occur a situation wherein a function expected to be called is not actually called, and the binary code preloaded into the first memory area MEM_AREA_1 is not actually used and continues to occupy the first memory area.

Therefore, in order to solve such a problem and to secure a free space in the first memory area, the memory controller 120 of the memory system 100 needs to evict some of the binary codes loaded into the first memory area, if necessary, to secure a free space in the first memory area.

Hereinafter, an operation of evicting a binary code loaded in the first memory area MEM_AREA_1 by the memory controller 120 of the memory system 100 will be described.

Figure 11:
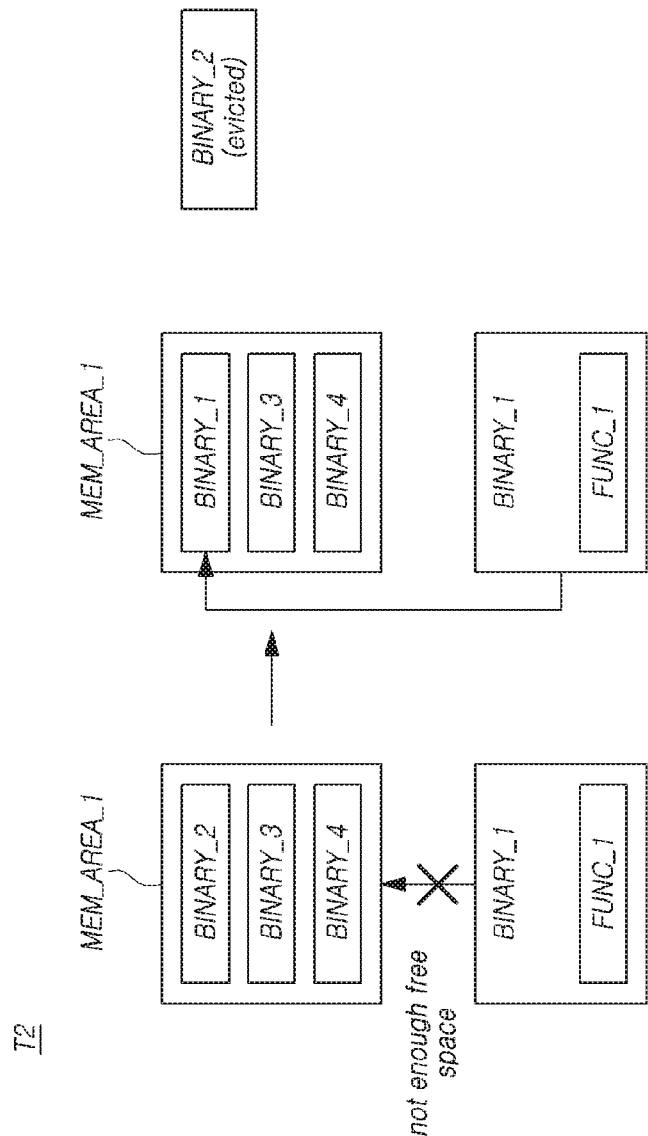
FIG. 11 is a diagram illustrating an operation of evicting a binary code loaded in a first memory area in a memory system 1 according to an embodiment of the present invention disclosure.

FIG. 11 is a diagram illustrating an example of evicting a binary code loaded in the first memory area in a memory system 100 according to an embodiment of the present invention disclosure.

Referring to FIG. 11, when the size of the free space in the first memory area MEM_AREA_1 is less than the size of the binary code BINARY_1 including the first function FUNC_1 at the second timepoint T2, the memory controller 120 of the memory system 100 may evict at least one of binary codes preloaded into the first memory area MEM_AREA_1 at the second timepoint T2 (eviction candidate binary codes) from the first memory area MEM_AREA_1.

The fact that the size of the free space in the first memory area MEM_AREA_1 is less than the size of the binary code BINARY_1 including the first function FUNC_1 may mean that the size of the free space in the first memory area MEM_AREA_1 is insufficient to normally load the binary code BINARY_1 including the first function FUNC_1.

Hereinafter, the binary codes BINARY_2, BINARY_3, and BINARY_4 are loaded into the first memory area MEM_AREA_1 at the second timepoint T2, and the size of the free space in the first memory area MEM_AREA_1 is accordingly less than the size of the binary code BINARY_1 including the first function FUNC_1. Therefore, the eviction candidate binary codes are the binary codes BINARY_2, BINARY_3, and BINARY_4.

To secure free space in the first memory area MEM_AREA_1, the memory controller 120 may evict one of the eviction candidate binary codes BINARY_2, BINARY_3, and BINARY_4, particularly binary code BINARY_2, from the first memory area MEM_AREA_1. Thereafter, the memory controller 120 may load binary code BINARY_1 into the free space generated by evicting the binary code BINARY_2.

In the above description only binary code BINARY_2 is evicted from the first memory area MEM_AREA_1. However, if the free space is insufficient to load the binary code BINARY_1 into the first memory area MEM_AREA_1 even after evicting binary code BINARY_2, the memory controller 120 may additionally evict at least one of the binary codes BINARY_3 and BINARY_4 to secure the free space.

When the memory controller 120 evicts at least one of the binary codes preloaded into the first memory area MEM_AREA_1 (eviction candidate binary codes), the memory controller 120 preferably evicts a binary code having the lowest possibility that the same will be used later.

This is because, if a binary code evicted by the memory controller 120 needs to be reloaded into the first memory area MEM_AREA_1 immediately after eviction, an overhead may occur in the process of the memory controller 120 securing a free space in the first memory area MEM_AREA_1 and reloading the evicted binary code.

Therefore, the memory controller 120 may configure an eviction policy for determining a binary code having the lowest possibility that the same will be used later. The eviction policy such as LRU, FIFO, MRU, or the like may be variously determined. In the following description that the eviction policy is LRU or FIFO.

Figure 12:
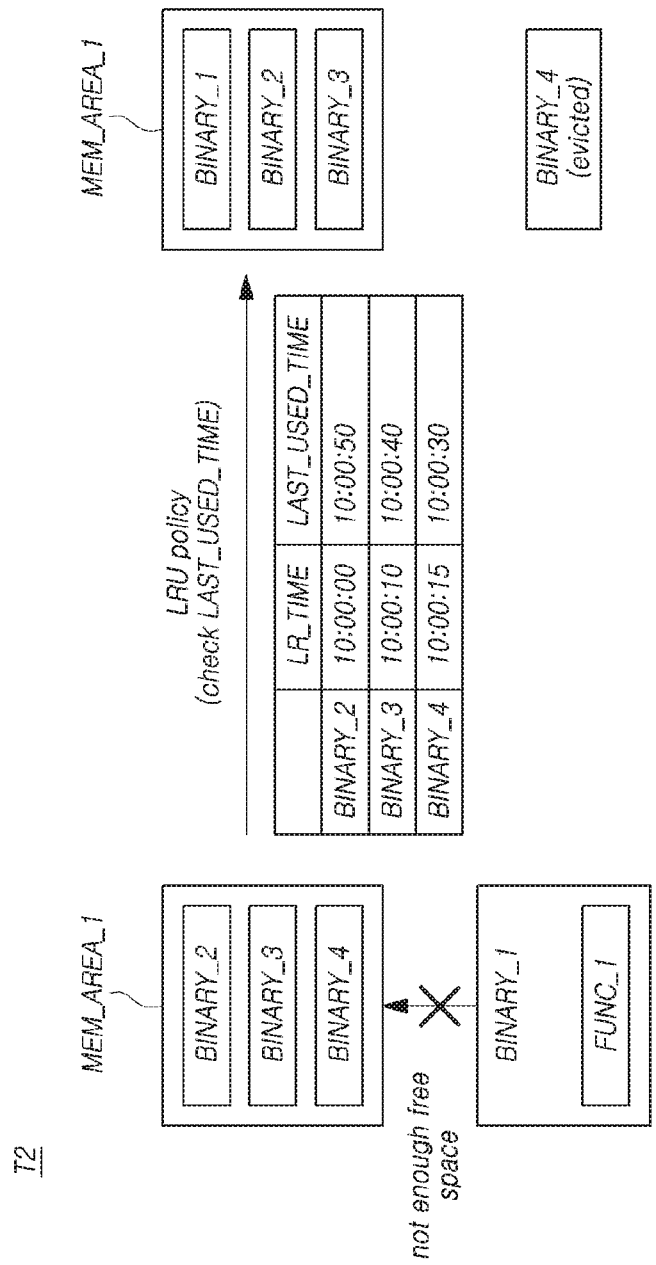
FIG. 12 is a diagram illustrating an operation of evicting a binary code loaded in a first memory area according to an eviction policy in a memory system according to an embodiment of the present invention disclosure.
Figure 13:
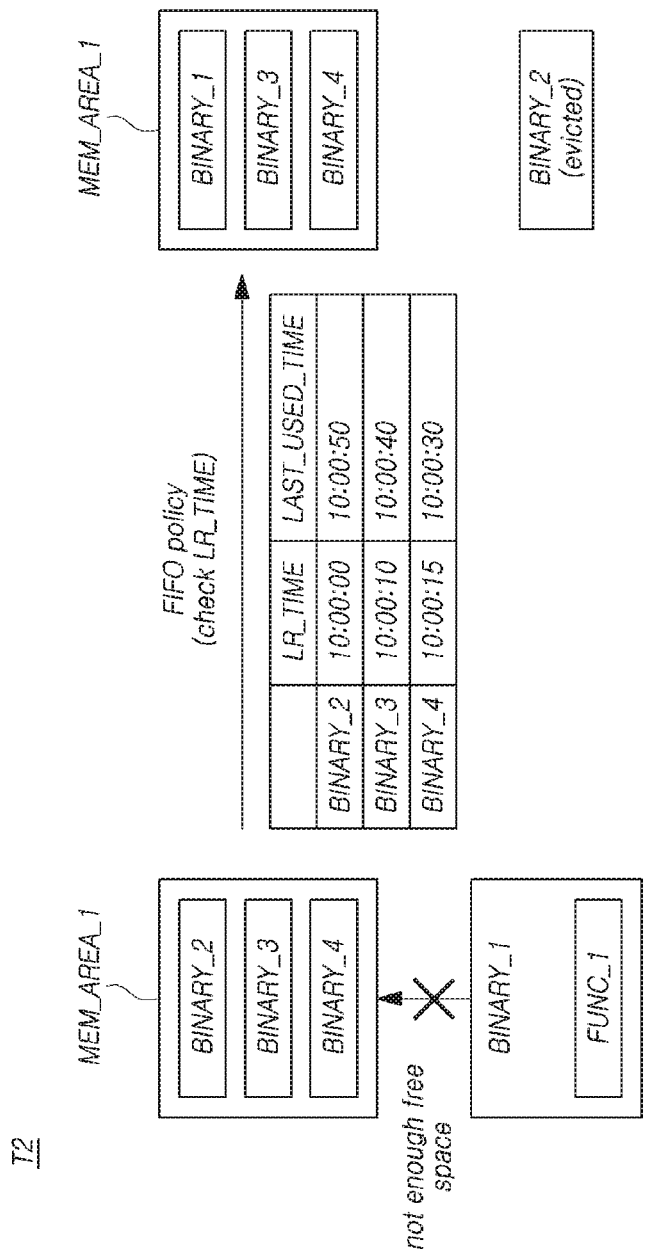
FIG. 13 is a diagram illustrating an operation of evicting a binary code loaded in a first memory area according to an eviction policy in a memory system according to an embodiment of the present invention disclosure.

FIG. 12 is a diagram illustrating an operation of evicting a binary code loaded into the first memory area according to an eviction policy in a memory system 100 according to an embodiment of the present invention disclosure, and FIG. 13 is a diagram illustrating an operation of evicting a binary code loaded into the first memory area according to an eviction policy in a memory system 100 according to an embodiment of the present invention disclosure.

Referring to FIG. 12, the memory controller 120 may determine an eviction target binary code from binary codes BINARY_2, BINARY_3, and BINARY_4 loaded into the first memory area MEM_AREA_1 on the basis of a least recently used (LRU) policy.

When the LRU policy is used, the memory controller 120 may determine binary code BINARY_4, which has the oldest last used time LAST_USED_TIME among the binary codes BINARY_2, BINARY_3, and BINARY_4 loaded into the first memory area MEM_AREA_1, as the eviction target binary code.

The last used time LAST_USED_TIME of a binary code refers to the time when one of the functions included in the binary code was called for the last time.

In FIG. 12, the last used time LAST_USED_TIME of binary code BINARY_2 is 10:00:50, the last used time LAST_USED_TIME of binary code BINARY_3 is 10:00:40, and the last used time LAST_USED_TIME of binary code BINARY_4 is 10:00:30 (although the last used time LAST_USED_TIME is expressed in a (hour: minute: second) format in embodiments of the present invention disclosure, this is only an example, and the format for expressing the last used time LAST_USED_TIME may be variously determined).

In this case, the memory controller 120 may evict binary code BINARY_4, which has the oldest last used time LAST_USED_TIME, to secure a free space for binary code BINARY_1 In the first memory area MEM_AREA_1.

The loading time LR_TIME at which the binary code BINARY_4 was loaded into the first memory area MEM_AREA_1 is 10:00:15, which comes later than the loading time LR_TIME of binary code BINARY_2 (10:00:15) and the loading time LR_TIME of binary code BINARY_3 (10:00:10). Although the loading time LR_TIME is expressed in a (hour: minute: second) format in embodiments of the present invention disclosure, this is only an example, and the format for expressing the loading time LR_TIME may be variously determined.

However, since binary code BINARY_4 has the oldest last used time, the memory controller 120 may determine that binary code BINARY_4 has the lowest possibility that the same will be used later.

Unlike the example in FIG. 12, the memory controller 120 may determine the eviction target binary code among the binary codes BINARY_2, BINARY_3, and BINARY_4 loaded into the first memory area MEM_AREA_1 on the basis of a first-in-first-out (FIFO) policy.

When the FIFO policy is applied, the memory controller 120 may determine, as the eviction target binary code, binary code BINARY_2, which has the oldest loading time LR_TIME at which the same was loaded into the first memory area MEM_AREA_1, among the binary codes BINARY_2, BINARY_3, and BINARY_4 loaded into the first memory area MEM_AREA_1.

The loading time LR_TIME at which binary code BINARY_2 was loaded into the first memory area MEM_AREA_1 is 10:00:00, which precedes the loading time LR_TIME of binary code BINARY_3 (10:00:10) and the loading time LR_TIME of binary code BINARY_4 (10:00:15).

Therefore, the memory controller 120 may determine that binary code BINARY_2, which has the oldest loading time, has a low possibility that the same will be used later, thereby determining binary code BINARY_2 as the eviction target binary code.

Moreover, a binary code loaded into the first memory area MEM_AREA_1 in this manner may be executed in a memory area other than the first memory area MEM_AREA_1. Hereinafter, an operation of copying a binary code, which has been loaded into the first memory area MEM_AREA_1, to a different memory area during actual execution will be described.

Figure 14:
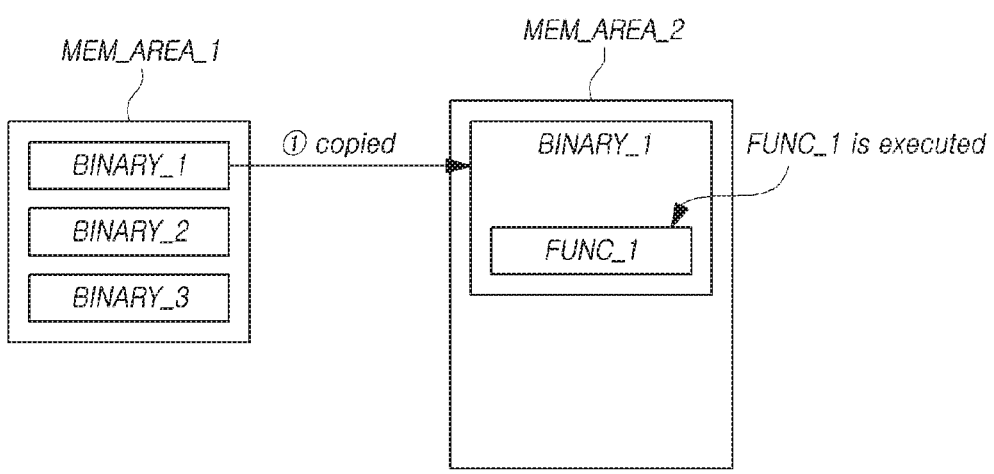
FIG. 14 is a diagram illustrating an operation of copying a binary code loaded into a first memory area to a second memory area in a memory system according to an embodiment of the present invention disclosure.
Figure 15:
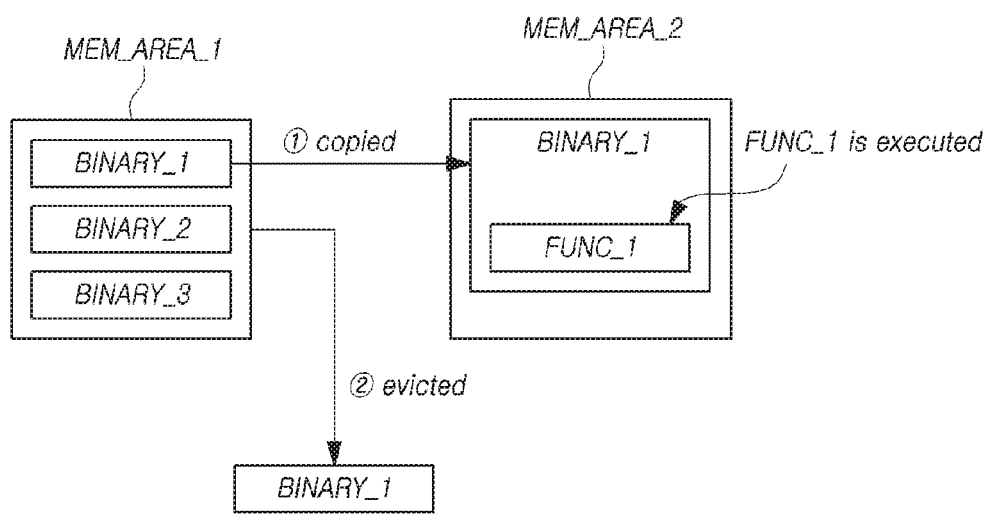
FIG. 15 is a diagram illustrating an operation of copying a binary code loaded into a first memory area to a second memory area in a memory system according to an embodiment of the present invention disclosure.
Figure 16:
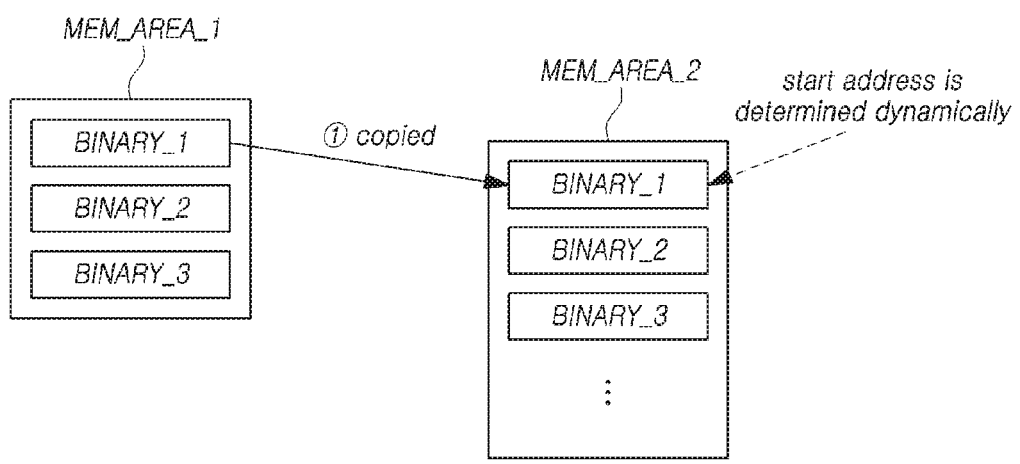
FIG. 16 is a diagram illustrating an operation of copying a binary code loaded into a first memory area to a second memory area in a memory system according to an embodiment of the present invention disclosure.

FIG. 14 is a diagram illustrating an operation of copying a binary code loaded into the first memory area to the second memory area in a memory system 100 according to an embodiment of the present invention disclosure, FIG. 15 is a diagram illustrating an operation of copying a binary code loaded into the first memory area to the second memory area in a memory system 100 according to an embodiment of the present invention disclosure, and FIG. 16 is a diagram illustrating an operation of copying a binary code loaded into the first memory area to the second memory area in a memory system 100 according to an embodiment of the present invention disclosure.

Referring to FIG. 14, in order to execute the first function FUNC_1, the memory controller 120 of the memory system 100 may copy the binary code BINARY_1 including the first function FUNC_1 to the second memory area MEM_AREA_2 which is different from the first memory area MEM_AREA_1. The second memory area MEM_AREA_2 may be included in the same working memory 125 as the fist memory area MEM_AREA_1, or positioned in a different device from the device in which the first memory area MEM_AREA_1 is positioned.

The operation of copying the binary code from the first memory area MEM_AREA_1 to the second memory area MEM_AREA_2 has a smaller overhead than the operation of loading a binary code stored in the memory device 110 because the former copies an already loaded binary code.

The reason the first memory area MEM_AREA_1 in which binary codes are preloaded and the second memory area MEM_AREA_2 in which binary codes are currently executed are separated in this manner is because the size of the memory area in which executed binary codes can be loaded is limited.

That is, if a binary code which is not currently executed but is likely to be executed later is additionally loaded into the memory area into which the currently executed binary code can be loaded, there may occur a problem in that the free space in the memory area in which the executed binary code can be loaded may become insufficient.

If a new binary code needs to be loaded into the corresponding memory area in this case, an additional overhead may occur in order to secure a free space. Therefore, in order to prevent this problem, the first memory area MEM_AREA_1 and the second memory area MEM_AREA_2 may be separated such that only the binary code to be executed actually, among preloaded binary codes, is stored in the second memory area MEM_AREA_2.

When the memory controller 120 copies the binary code BINARY_1 including the first function FUNC_1 to the second memory area MEM_AREA_2 which is different from the first memory area MEM_AREA_1 in order to call the first function FUNC_1 at the first timepoint T1 as described above, the memory controller 120 may evict the binary code BINARY_1 from the first memory area MEM_AREA_1 to secure a free space in the first memory area MEM_AREA_1.

This operation may be performed when there is a low possibility that a completely executed binary code will be executed again in the near future, thereby making it more advantageous for the memory controller 120 to reload the corresponding binary code into the fist memory area MEM_AREA_1 when there is a high possibility that the same will be executed later, than to keep the corresponding binary code loaded in the first memory area MEM_AREA_1.

Referring to FIG. 15, the memory controller 120 of the memory system 100 may copy the binary code BINARY_1 including the first function FUNC_1 to the second memory area MEM_AREA_2 which is different from the first memory area MEM_AREA_1, and then may evict the corresponding binary code BINARY_1 from the first memory area MEM_AREA_1. This may prevent the memory controller 120 from redundantly storing the binary code BINARY_1 in the first memory area MEM_AREA_1 and in the second memory area MEM_AREA_2.

When the binary code is copied from the first memory area MEM_AREA_1 to the second memory area MEM_AREA_2 as described above, the area in which the binary code including the first function FUNC_1 is stored inside the second memory area MEM_AREA_2 may be changed dynamically without being fixed.

Referring to FIG. 16, when copying the binary code BINARY_1 including the first function FUNC_1 to the second memory area MEM_AREA_2 which is different from the first memory area MEM_AREA_1, the memory controller 120 of the memory system 100 may dynamically determine the start address of the binary code BINARY_1 in the second memory area MEM_AREA_2.

The reason the start address of the binary code BINARY_1 is dynamically determined in the second memory area MEM_AREA_2 is because, when the first function FUNC_1 is called, binary codes loaded in the second memory area MEM_AREA_2 may change. That is, if the binary codes loaded into the second memory area MEM_AREA_2 change, the position of the free space in the second memory area MEM_AREA_2 changes, and the position in which the binary code BINARY_1 can be copied accordingly changes. Therefore, the start address of binary code BINARY_1 is dynamically determined.

Figure 17:
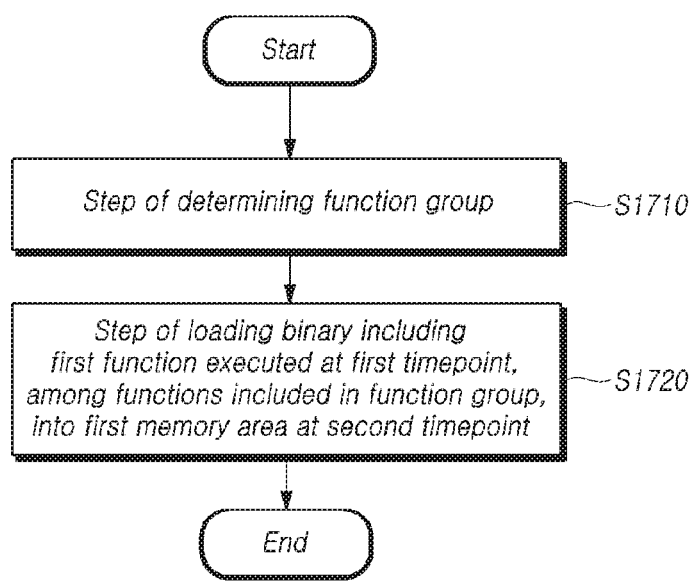
FIG. 17 is a flowchart illustrating a method for operating a memory system according to an embodiment of the present invention disclosure.

FIG. 17 is a flowchart illustrating a method for operating a memory system 100 according to an embodiment of the present invention disclosure.

The method for operating the memory system 100 may include a step (S1710) of determining a function group. The function group may include all or some of functions included in one of multiple binary codes included in firmware stored in a memory device 110 included in the memory system 100.

In addition, the method for operating the memory system 100 may include a step (S1720) of loading a binary code including a first function, which is called at a first timepoint, among the functions included in the function group mentioned above into a first memory area at a second timepoint that precedes the first timepoint.

The corresponding binary code may be determined on the basis of i) call path information of functions included in the function group and ii) call probability information regarding respective functions included in the function group.

The call path information of functions included in the function group may be generated on the basis of the result of static analysis of the function group, as described with reference to FIG. 7.

The binary code including the first function may be loaded into the first memory area at the second timepoint if the probability that the first function will be called is equal to or larger than a threshold probability.

When the size of the free space in the first memory area is less than the size of the binary code including the first function at the second timepoint, at least one of binary codes already loaded into the first memory area at the second time point (eviction candidate binary codes) may be evicted form the first memory area, as described with reference to FIG. 11.

In addition, when the first function is executed, the binary code including the first function may be copied to the second memory area which is different from the first memory area, as described with reference to FIG. 14.

The above-mentioned operations of the memory controller 120 may be controlled by the control circuit 123, and may be performed in such a manner that the processor 124 executes (drives) firmware in which the overall operation of the memory controller 120 is programmed.

Figure 18:
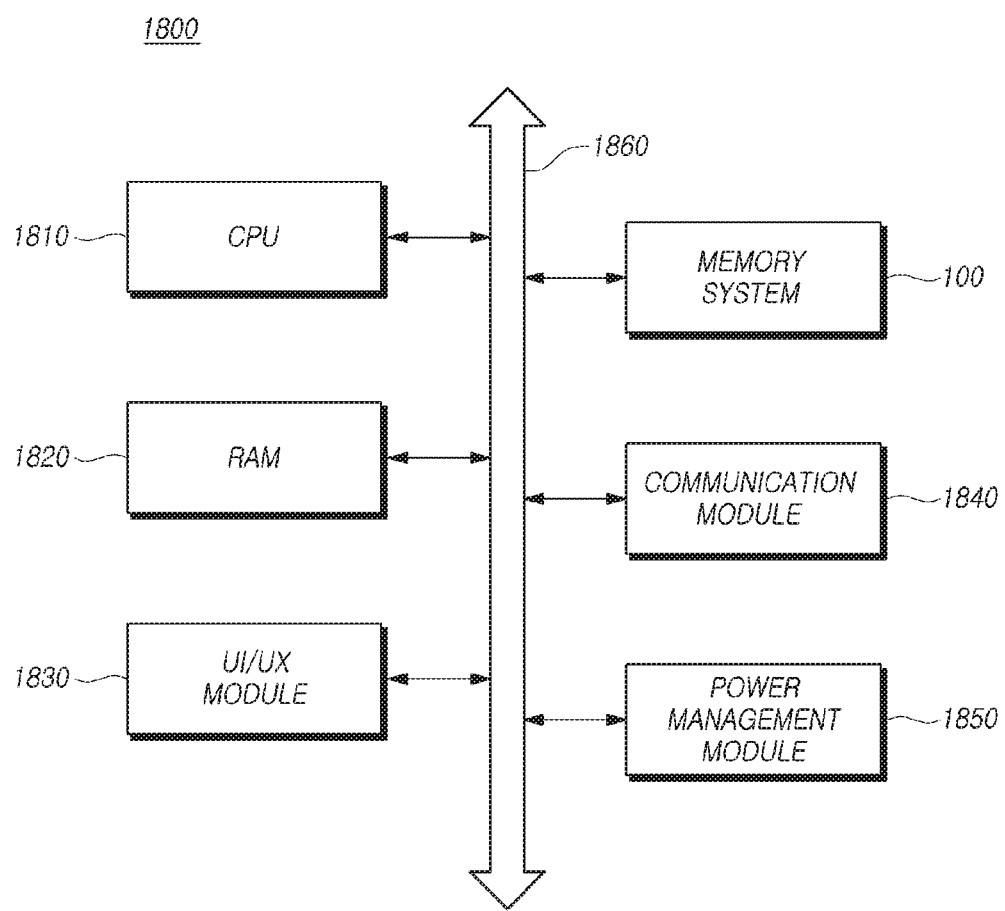
FIG. 18 is a diagram illustrating the configuration of a computing system according to an embodiment of the present invention disclosure.

FIG. 18 is a diagram illustrating the configuration of a computing system 1600 according to an embodiment of the present invention disclosure.

Referring to FIG. 18, the computing system 1800 according to an embodiment of the present invention disclosure may include: a memory system 100 electrically connected to a system bus 1860; a CPU 1810 configured to control the overall operation of the computing system 1800; a RAM 1820 configured to store data and information related to operations of the computing system 1800; a user interface/user experience (UI/UX) module 1830 configured to provide the user with a user environment; a communication module 1840 configured to communicate with an external device in a wired and/or wireless type; and a power management module 1850 configured to manage power used by the computing system 1800.

The computing system 1800 may be a personal computer (PC) or may include a mobile terminal such as a smartphone, a tablet or various electronic devices.

The computing system 1800 may further include a battery for supplying an operating voltage, and may further include an application chipset, a graphic-related module, a camera image processor (CIS), and a DRAM. Other elements would be obvious to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

According to embodiments of the present invention disclosure described above, the operation delay time of the memory system may be minimized.

In addition, according to an embodiment of the present invention disclosure, an overhead occurring in the process of calling a specific function may be minimized.

Although various embodiments of the present invention disclosure has been described for illustrative purposes, those skilled in the art will appreciate that various modifications, additions and substitutions are possible, without departing from the scope and spirit of the disclosure as disclosed in the accompanying claims. Therefore, embodiments of the present invention disclosure have been described for the sake of brevity and clarity. The scope of the present invention disclosure shall be construed on the basis of the accompanying claims in such a manner that all of the technical ideas included within the scope equivalent to the claims belong to the present invention disclosure.

What is claimed is:

1. A memory system comprising:
   a memory device storing firmware comprising multiple binary codes; and
   a memory controller configured to control the memory device,
   wherein the memory controller stores a function group comprising functions included in one of the multiple binary codes and loads a binary code comprising a first function called at a first timepoint into a first memory area at a second timepoint preceding the first timepoint based on call path information indicating a relationship among the functions included in the function group and call probability information of the functions included in the function group,
   wherein the call probability information indicates a probability that inferior functions are called when a superior function is called,
   wherein call frequency of each of the functions has not been measured, and prior to a static analysis of the function group, the call probability information of the functions included in the function group is initialized so that each of the functions included in the function group has a uniform call frequency percentage, thereafter the memory controller generates the call path information of the functions included in the function group on a basis of a result of the static analysis of the function group, and
   wherein
   the static analysis is conducted while the functions included in the function group are not called,
   the static analysis is conducted outside the memory system by analysis of the call path information, the call path information setting forth conditions for calling one function after another function in the function group, and
   the result of the static analysis is stored inside the memory system.

2. The memory system of claim 1, wherein the memory controller is configured to measure call frequencies of the functions included in the function group during runtime and to update the call probability information regarding the functions included in the function group.

3. The memory system of claim 1, wherein the binary code comprising the first function is loaded into the first memory area at the second timepoint when a probability that the first function will be called is equal to or greater than a threshold probability.

4. The memory system of claim 1, wherein, when a size of free space in the first memory area is less than a size of the binary code comprising the first function at the second timepoint, the memory controller is configured to evict at least one of eviction candidate binary codes from the first memory area, the eviction candidate binary codes being binary codes already loaded into the first memory area at the second timepoint.

5. The memory system of claim 4, wherein the memory controller is configured to determine an eviction target binary code from the eviction candidate binary codes on a basis of a least recently used (LRU) policy.

6. The memory system of claim 4, wherein the memory controller is configured to determine an eviction target binary code from the eviction candidate binary codes on a basis of a first-in-first-out (FIFO) policy.

7. The memory system of claim 1, wherein the memory controller is configured to copy the binary code comprising the first function to a second memory area which is different from the first memory area, in order to execute the first function.

8. The memory system of claim 7, wherein the binary code comprising the first function is evicted from the first memory area after being copied to the second memory area.

9. The memory system of claim 7, wherein a start address of an area in which the binary code comprising the first function is copied inside the second memory area is determined dynamically.

10. A memory controller comprising:
    a memory interface configured to communicate with a memory device storing firmware comprising multiple binary codes; and
    a control circuit configured to control the memory device,
    wherein the control circuit stores a function group comprising functions included in one of the multiple binary codes and loads a binary code comprising a first function called at a first timepoint into a first memory area at a second timepoint preceding the first timepoint based on call path information indicating a relationship among the functions included in the function group and call probability information of the functions included in the function group,
    wherein the call probability information indicates a probability that inferior functions are called when a superior function is called,
    wherein call frequency of each of the functions has not been measured, and prior to a static analysis of the function group, the call probability information of the functions included in the function group is initialized so that each of the functions included in the function group has a uniform call frequency percentage, thereafter the control circuit generates the call path information of the functions included in the function group on a basis of a result of the static analysis of the function group, and
    wherein
    the static analysis is conducted while the functions included in the function group are not called,
    the static analysis is conducted outside the memory controller by analysis of the call path information, the call path information setting forth conditions for calling one function after another function in the function group, and
    the result of the static analysis is stored inside the memory controller system.

11. The memory controller of claim 10, wherein the binary code comprising the first function is loaded into the first memory area at the second timepoint when a probability that the first function will be called is equal to or greater than a threshold probability.

12. The memory controller of claim 10, wherein, when a size of a free space of the first memory area is less than a size of the binary code comprising the first function at the second timepoint, the control circuit is configured to evict at least one of eviction candidate binary codes from the first memory area, the eviction candidate binary codes being binary codes already loaded into the first memory area at the second timepoint.

13. The memory controller of claim 10, wherein the control circuit is configured to copy the binary code comprising the first function to a second memory area which is different from the first memory area, in order to execute the first function.

14. A method for operating a memory system comprising a memory device storing firmware comprising multiple binary codes, the method comprising:
    determining a function group comprising functions included in one of the multiple binary codes; and
    loading a binary code comprising a first function called at a first timepoint into a first memory area at a second timepoint preceding the first timepoint based on call path information indicating a relationship among the functions included in the function group and call probability information of the functions included in the function group,
    wherein the call probability information indicates a probability that inferior functions are called when a superior function is called,
    wherein call frequency of each of the functions has not been measured, and prior to a static analysis of the function group, the call probability information of the functions included in the function group is initialized so that each of the functions included in the function group has a uniform call frequency percentage, thereafter the call path information of the functions included in the function group is generated on a basis of a result of the static analysis of the function group, and
    wherein
    the static analysis is conducted while the functions included in the function group are not called,
    the static analysis is conducted outside the memory system by analysis of the call path information, the call path information setting forth conditions for calling one function after another function in the function group, and
    the result of the static analysis is stored inside the memory system.

15. The method of claim 14, wherein the binary code comprising the first function is loaded into the first memory area at the second timepoint when a probability that the first function will be called is equal to or greater than a threshold probability.

16. The method of claim 14, wherein, when a size of a free space of the first memory area is less than a size of the binary code comprising the first function at the second timepoint, at least one of eviction candidate binary codes are evicted from the first memory area, the eviction candidate binary codes being binary codes already loaded into the first memory area at the second timepoint.

17. The method of claim 14, further comprising copying the binary code comprising the first function to a second memory area which is different from the first memory area when the first function is executed.

* * * * *